United States Patent
Kato

(10) Patent No.: US 8,300,238 B2
(45) Date of Patent: Oct. 30, 2012

(54) PRINT CONTROL DEVICE AND METHOD

(75) Inventor: Hisashi Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 440 days.

(21) Appl. No.: 12/518,418

(22) PCT Filed: Mar. 18, 2008

(86) PCT No.: PCT/JP2008/055624
§ 371 (c)(1),
(2), (4) Date: Jun. 9, 2009

(87) PCT Pub. No.: WO2008/117807
PCT Pub. Date: Oct. 2, 2008

(65) Prior Publication Data
US 2010/0027043 A1 Feb. 4, 2010

(30) Foreign Application Priority Data
Mar. 26, 2007 (JP) .................................. 2007-080190

(51) Int. Cl.
*G06F 15/00* (2006.01)
*G06F 3/00* (2006.01)

(52) U.S. Cl. .......................................... 358/1.13; 710/8

(58) Field of Classification Search ................... 358/1.12
See application file for complete search history.

(56) References Cited

U.S. PATENT DOCUMENTS
7,325,235 B2  1/2008  Iida et al.

| | | |
|---|---|---|
| 2003/0056179 A1 | 3/2003 | Mori |
| 2006/0103867 A1 | 5/2006 | Kato |
| 2006/0256360 A1 | 11/2006 | Kayama |
| 2011/0063677 A1* | 3/2011 | Shah .......................... 358/1.15 |

FOREIGN PATENT DOCUMENTS

| | | |
|---|---|---|
| JP | 2003-162519 A | 6/2003 |
| JP | 2005-311477 | 11/2005 |
| JP | 2006-253988 | 9/2006 |
| JP | 2006-293554 | 10/2006 |
| JP | 2006-344172 | 12/2006 |
| JP | 2007-011576 | 1/2007 |

OTHER PUBLICATIONS

"Print Ticket and Print Capabilities Support in Windows Print Drivers" pp. 1-23, Microsoft Corporation, dated Feb. 6, 2006.

(Continued)

*Primary Examiner* — Saeid Ebrahimi Dehkordy
(74) *Attorney, Agent, or Firm* — Fitzpatrick, Cella, Harper & Scinto

(57) ABSTRACT

According to the present invention, internal print settings of a document are handed over to hot folder settings. A hot folder manager 200 stores handover settings in the XPS performance settings 216 and stores print settings in PT data 217 and JDF data 218. On receipt of an input XPS document, the hot folder manager consults the handover settings, reads values of specified items from the internal print settings recorded in a print ticket of the XPS document, and merges the specified items with external print settings stored in the PT data 217 or the JDF data 218. The new print settings resulting from the merge are appended to document data in a specified output format, and transmitted to a print device 103.

12 Claims, 33 Drawing Sheets

OTHER PUBLICATIONS

PCT International Search Report in corresponding International Application No. PCT/JP2008/055624, dated Mar. 6, 2008.
Written Opinion of the International Searching Authority in corresponding International Application No. PCT/JP2008/055624, dated Mar. 6, 2008.
http://www.microsoft.com/whdc.xps/xpsspecdwn.mspx(XPS_1_0.exe), Oct. 25, 2006.
Japanese Office Action dated Jul. 6, 2012 issued in corresponding Japanese Patent Application No. 2011-102299.

* cited by examiner

2701 — `<PrintTicket>`
2702 — `  <Property Name="InheritLevel">Page</Property>`
2703 — `  <Property Name="InheritFeatures">`
2704 — `    <Value>PageMediaSize</Value>`
`    <Value>PageOutputColor</Value>`
`  </Property>`
`  <Feature Name="JobDuplex">`
`    <Option Name="TwoSided"/>`
`  </Feature>`
`  <Feature Name="PageMediaSize">`
`    <Option Name="ISOA4"/>`
`  </Feature>`
`  <Feature Name="PageOutputColor">`
`    <Option Name="Mono"/>`
`  </Feature>`
`  <Feature Name="PageOrientation">`
`    <Option Name="Portrait"/>`
`  </Feature>`
`  <Feature Name="PageResolution">`
`    <Option Name="600dpi"/>`
`  </Feature>`
`</PrintTicket>`

FIG. 29

```
<PrintTicket>
    <Property Name="InheritLevel">None</Property>
    <Feature Name="JobDuplex">
        <Option Name="TwoSided"/>
    </Feature>
    <Feature Name="PageMediaSize">
        <Option Name="ISOA4"/>
    </Feature>
    <Feature Name="PageOutputColor">
        <Option Name="Color"/>
    </Feature>
    <Feature Name="PageOrientation">
        <Option Name="Portrait"/>
    </Feature>
    <Feature Name="PageResolution">
        <Option Name="600dpi"/>
    </Feature>
</PrintTicket>
```

F I G. 31

```
<PrintTicket>
    <Property Name="InheritLevel">Page</Property>
    <Property Name="InheritFeatures">
        <Value>PageMediaSize</Value>
        <Value>PageOutputColor</Value>
    </Property>
    <Feature Name="JobDuplex">
        <Option Name="TwoSided"/>
    </Feature>
    <Feature Name="PageMediaSize">
        <Option Name="ISOA4"/>
    </Feature>
    <Feature Name="PageOutputColor">
        <Option Name="Mono"/>
    </Feature>
    <Feature Name="PageOrientation">
        <Option Name="Portrait"/>
    </Feature>
    <Feature Name="PageResolution">
        <Option Name="600dpi"/>
    </Feature>
</PrintTicket>
```

2700

Fixed Document Sequence

Fixed Document 1 — Fixed Document 2

Fixed Page 1, Fixed Page 2, Fixed Page 3, Fixed Page 4, Fixed Page 5, Fixed Page 6, Fixed Page 7, Fixed Page 8

3102:
PageOutputColor=Color
PageMediaSize=ISOA3
PageResolution=600dpi

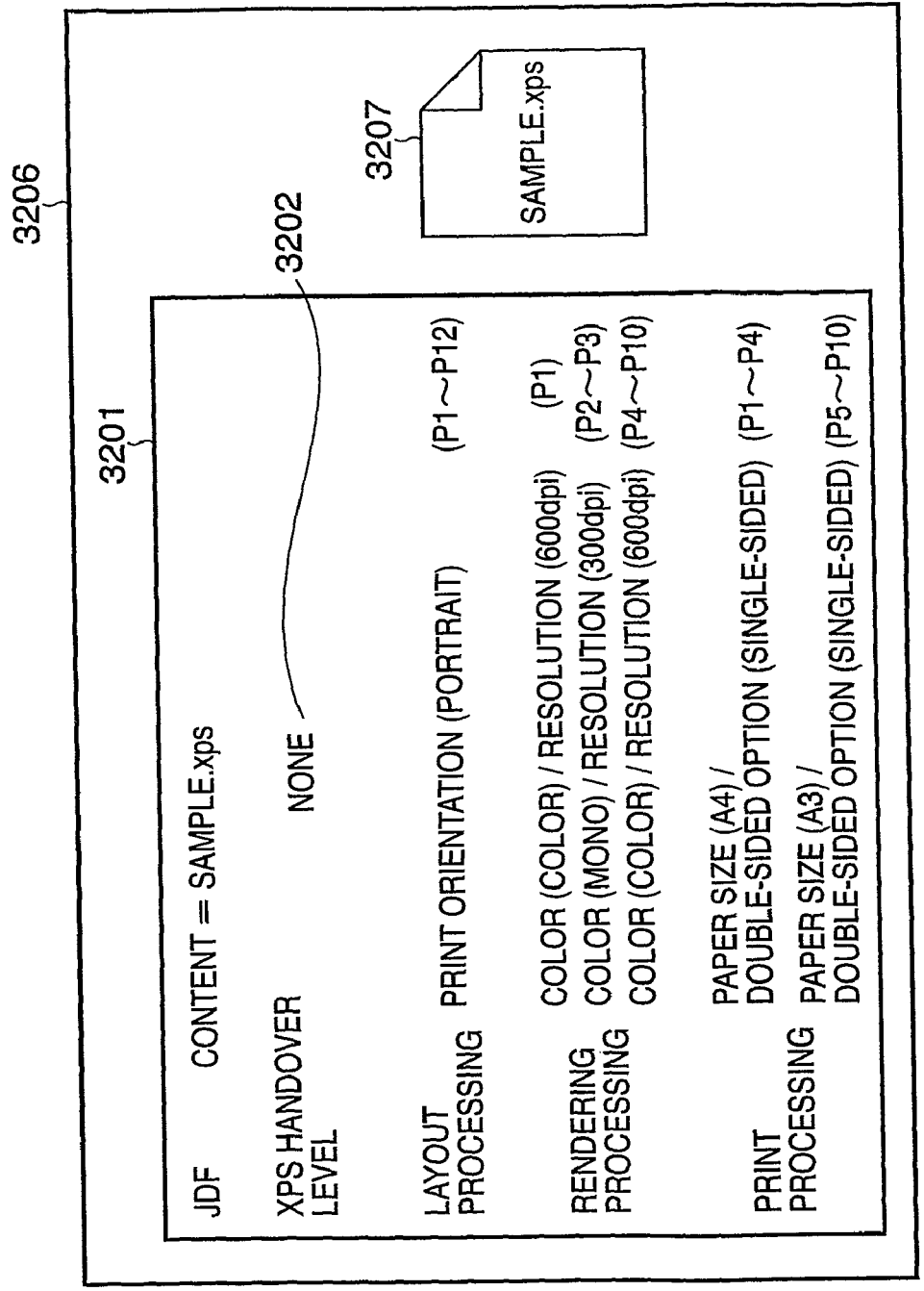

PRINT CONTROL DEVICE AND METHOD

TECHNICAL FIELD

The present invention relates to a print control device and method for processing data such as document data, and causing a printer device to issue a print job.

BACKGROUND ART

Windows Vista from Microsoft. Corp. supports a new XML document format known as XPS (XML Paper Specification) (see "XML Paper Specification", Oct. 25, 2006, Microsoft Corp., <http://www.microsoft.com/whdc/xps/xpsspecdwn.mspx(XPS_1_0.exe)> [search performed on Jan. 31, 2007]), hereinafter referred to as non-patent document 1). An XPS document has a format which includes three layers which are a FixedDocumentSequence layer, a FixedDocument layer, and FixedPage layer as shown in FIG. 13. The nodes of each layer can be associated with an XML document for storing print attributes (i.e. print settings) called a print ticket (see "Print Ticket and Print Capabilities Support in Windows Print Drivers", Feb. 15, 2006, Microsoft Corp., <http://www.microsoft.com/whdc/device/print/XPS-Drv_PrintTicket.mspx(XPSDrv_PrintTicket.doc)> [search performed on Jan. 31, 2007], hereinafter referred to as a non-patent document 2). As shown in the example of FIG. 13, a job level print ticket 1304 is associated with the FixedDocumentSequence. A document level print ticket 1305 is associated with the FixedDocument1. A page level print ticket 1306 is associated with the FixedPage1. Since a print ticket can be specified for each node of each layer, XPS documents allow operations such as changing an output paper size for each FixedPage. In an XPS document, by specifying print settings associated with each page (FixedPage) or set of pages (FixedDocument), it is possible exceptional settings can be expressed within a single document.

Some conventional print drivers have a page exceptional setting function which allows print settings differing from the print settings for the overall print job generated by the print driver, to be specified for particular pages. For instance, the PostScript printer driver from Xerox Corp. has a section-specific setting function unit. The section-specific setting function unit provides a function for storing different print settings for each section of a document as a section setting information file. This function may also be employed by hot folders which make use of the printer driver. A hot folder is a folder that has been associated with predefined functions, whereby data put into the folder is subjected to processing according to the sequence of functions associated with the folder.

The PostScript printer driver from Heidelberg Corp. has a function for predetermining exceptional print parameters with respect to basic setting parameters. Consider, for instance, a case in which the exceptional print parameters have been set to give a paper size of A3 and a page layout of 1-up, and the basic setting parameters have been set to give a paper size of A4 and a page layout of 2-up. When the document to be printed has five pages of sizes A4, A4, A3, A4 and A4, the first and second pages of the manuscript are of A4 size and so the layout will be 2-up in accordance with the basic settings. Since the third page of the manuscript is of A3 size, corresponding to an exceptional print parameter, the layout will be 1-up. The fourth and fifth pages are printed in 2-up form in accordance with the basic print settings.

When printing is performed using either of the above-described printer drivers, a method is used in which a user first specifies a page or range of pages on which to perform the exceptional settings, thereby forming partitions. Exceptional settings are then set for the specified partitions using another print setting sheet or dialogue box.

As described in the non-patent document 1, the XPS document has both a spool format, used when printing, and a digital document format used in document distribution and the like. In other words, the XPS document can be used, in a similar way to PDF documents from Adobe Corp., for the publication and distribution of various types of document. For instance, it is possible to create an XPS document having a print ticket (i.e. print settings) associated with the node or nodes of the desired layer, and distribute the XPS document together with the print settings. As the use of XPS documents in digital documents spreads, technologies such direct print which allows documents to be printed without going through a computer, and hot folder which makes use of a computer will become necessary as means to print the digital documents in a simple manner. The hot folder is a folder that is associated with predetermined print settings. When document data is put into the hot folder, functions associated with the folder are executed. Direct print is a function for printing documents using a stand-alone printing device without going through a computer.

When an XPS document is to be printed using a hot folder, the print settings included in the XPS document do not necessarily match the print settings associated with the hot folder. In particular in the XPS document, when exceptional settings exist for a page or set of pages, either the overall print settings or the exceptional print settings will no longer match the hot folder print settings (also referred to as "folder settings"). Note that the "page" corresponds to the "FixedPage", the "set of pages" corresponds to the "FixedDocument", and the "overall" corresponds to the "FixedDocumentSequence".

For instance, the XPS document may be applied in form documents which have a fixed output paper size. For this application, because the form size is fixed, the output paper size must be specified in advance within the XPS document. However, when printer device-dependent settings such as the paper feeder setting are specified using the print tickets, there will be occasions when the paper feeder specified by the destination hot folder print settings and the paper feeder specified using the XPS document fail to match. On such occasions, the paper size setting must follow the print settings in the XPS document, but the paper feeder setting must change flexibly according to the print device.

As a way of solving this problem, Japanese Patent Laid-Open No. 2006-293554 discloses a hot folder capable of setting a different print ticket for each set of print data to be printed by specifying print settings in a plurality of subfolders.

However, according to the technology of Japanese Patent Laid-Open No. 2006-293554, in the case that the document includes print settings in the manner of an XPS document, it is not possible to use these print settings. Hence, when output based on the specific settings included in the XPS document is desired as in the example of the form data, it is not possible to achieve the original output results unless the user knows the print settings specified in the XPS document and switches the hot folder settings accordingly.

Also, when the exceptional settings are specified in the hot folder which outputs in the XPS document format, it is necessary to edit the print ticket of each page. Hence, when the number of pages in the document or the number of exceptional settings becomes large, more work is required to carry out the editing. This leads not only to a decrease in productivity but also to an increase in the risk of mistakes due to human error.

The present invention was conceived looking carefully at the conventional examples with the object of solving the above-described problems. More specifically, the present invention provides a print control device and method capable of handing over, to hot folder settings, a specified level (including or not including exceptions) and specified items from among print settings included in document data of the XPS format or the like.

DISCLOSURE OF INVENTION

To solve the above-described problems the present invention is a print control device for appending externally defined external print settings to document data that includes internal print settings, the print control device including: a storage means configured to receive and store input of the external print settings and input of handover settings relating to handover of the internal print settings; a generating means configured to generate new print settings by merging, when handover of the internal print settings has been specified by the handover settings, an item specified for handover from among the internal print settings with the external print settings; and a data transmission means configured to transmit the print settings generated by the generating means together with the document data to a printer device.

According to the present invention, it is possible to solve the described problems above. Specifically, it is possible to hand over a specified level (including or not including exception) and specified items among print settings included in document data of XPS documents or the like to the hot folder settings.

Further features of the present invention will become apparent from the following description of exemplary embodiments with reference to the attached drawings.

BRIEF DESCRIPTION OF DRAWINGS

FIG. 27 is a diagram showing an example of a print ticket in which XPS handover settings have been specified;
FIG. 29 is a diagram showing an example of a print ticket in which XPS handover settings have been specified;
FIG. 31 is a diagram showing an example of an XPS document in which a print ticket including XPS handover settings has been specified;
FIG. 32 is a diagram showing an example of a JDF in which an XPS document has been specified as content data.

BEST MODE FOR CARRYING OUT THE INVENTION

First Embodiment

<System Construction>

Figure 1:
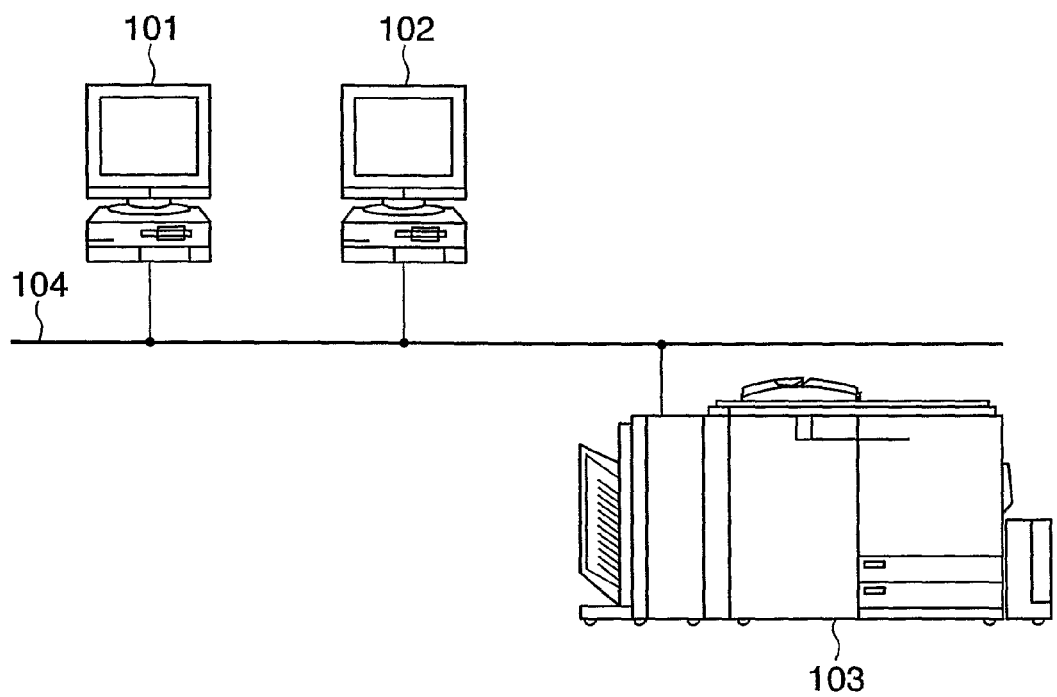
FIG. 1 is a diagram showing a printing system.

FIG. 1 is a diagram showing printing system construction. As shown in FIG. 1, the printing system is constructed from a client PC 101 and a printer 103 which are able to communicate with each other by means of a network 104 which is a communications medium. To indicate that a plurality of client PCs exist on the network, the drawing shows two PCs, which are the client PC 101 and a client PC 102. Since both client PCs have the same construction, only the client PC 101 is used in the following description. The client PC 101 is loaded with a hot folder for receiving and printing a digital document, specifically an XPS document having a layer structure. The printer 103 is capable of interpreting the XPS document, and printing in accordance with print settings included in the XPS document. The printer 103 is also capable of interpreting JDF, and printing a JDF-associated document in accordance with print settings defined in the JDF. Note also that, together, the job control information which includes the print settings, and document content which is to be printed are called a document package. The print settings included in the XPS document form a part of the XPS document, and can be called internal print settings or document-dependent print settings. On the other hand, print settings which are defined for the hot folder externally can be called external print settings or document-independent print settings.

<Construction of Hot Folder in the Present Invention>

Figure 2:
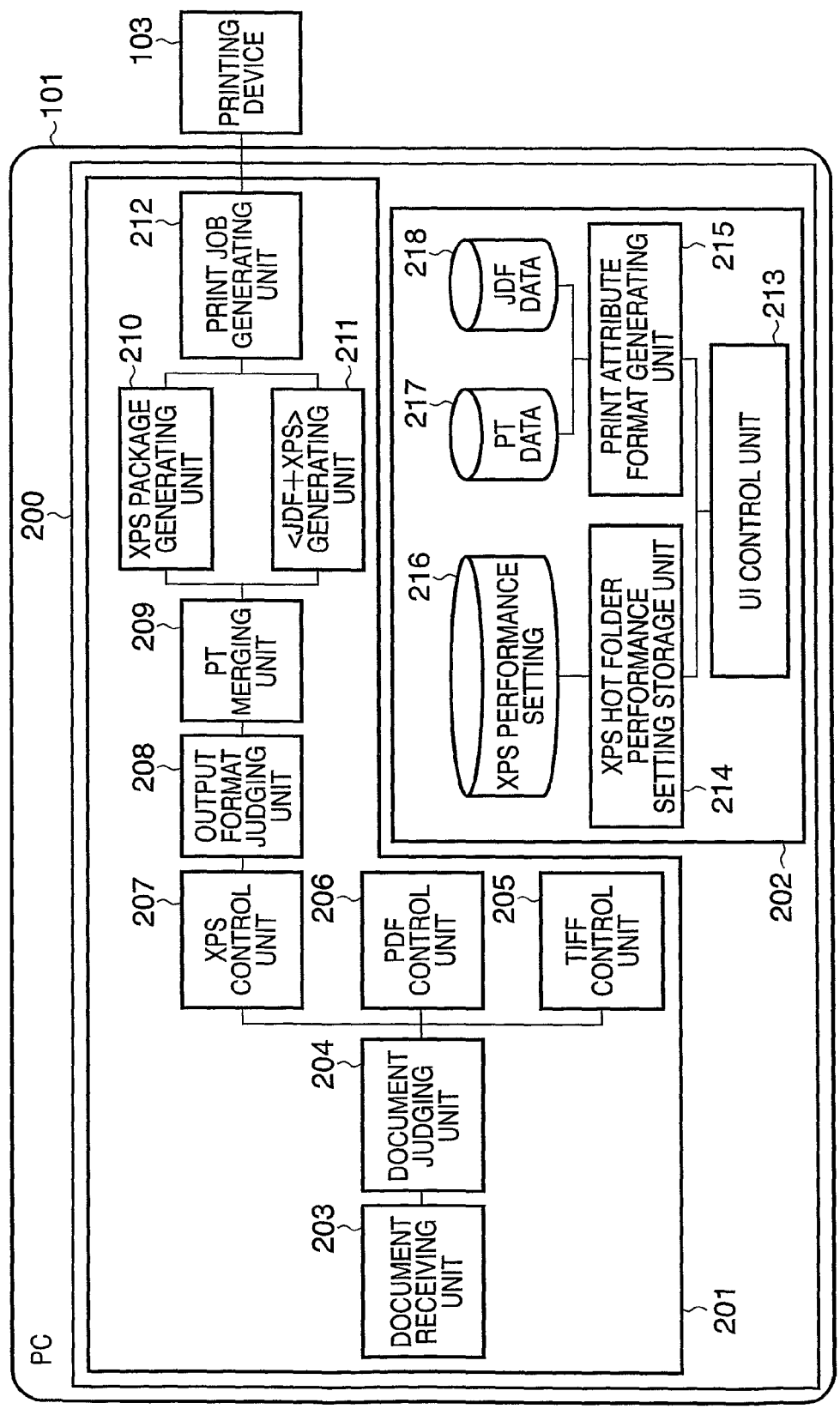
FIG. 2 is a diagram showing hot folder construction.

FIG. 2 shows a construction of a hot folder manager 200 for controlling operations of the hot folder of the present embodiment. The hot folder manager 200 is loaded into the client PC 101, and constitutes a system for controlling hot folder settings and processing input digital documents. The hot folder manager 200 includes a document control unit 201 and a setting control unit 202. The following describes control units which make up the hot folder 200.

<Description of Setting Control Units of the Hot Folder in the Present Invention>

A UI control unit 213 of the setting control unit 202 is a UI control unit for specifying print settings and operation settings of the hot folder in advance. The UI control unit 213 provides the operation screens of FIGS. 3 through 7, to be described later. A setting storage process of the UI control unit 213 at setting of the print settings is described below with reference to the flowchart of FIG. 8. Settings values input using the UI screens shown in FIGS. 3 through 7 are temporarily stored using a format that allows identification of each item.

Figure 3:
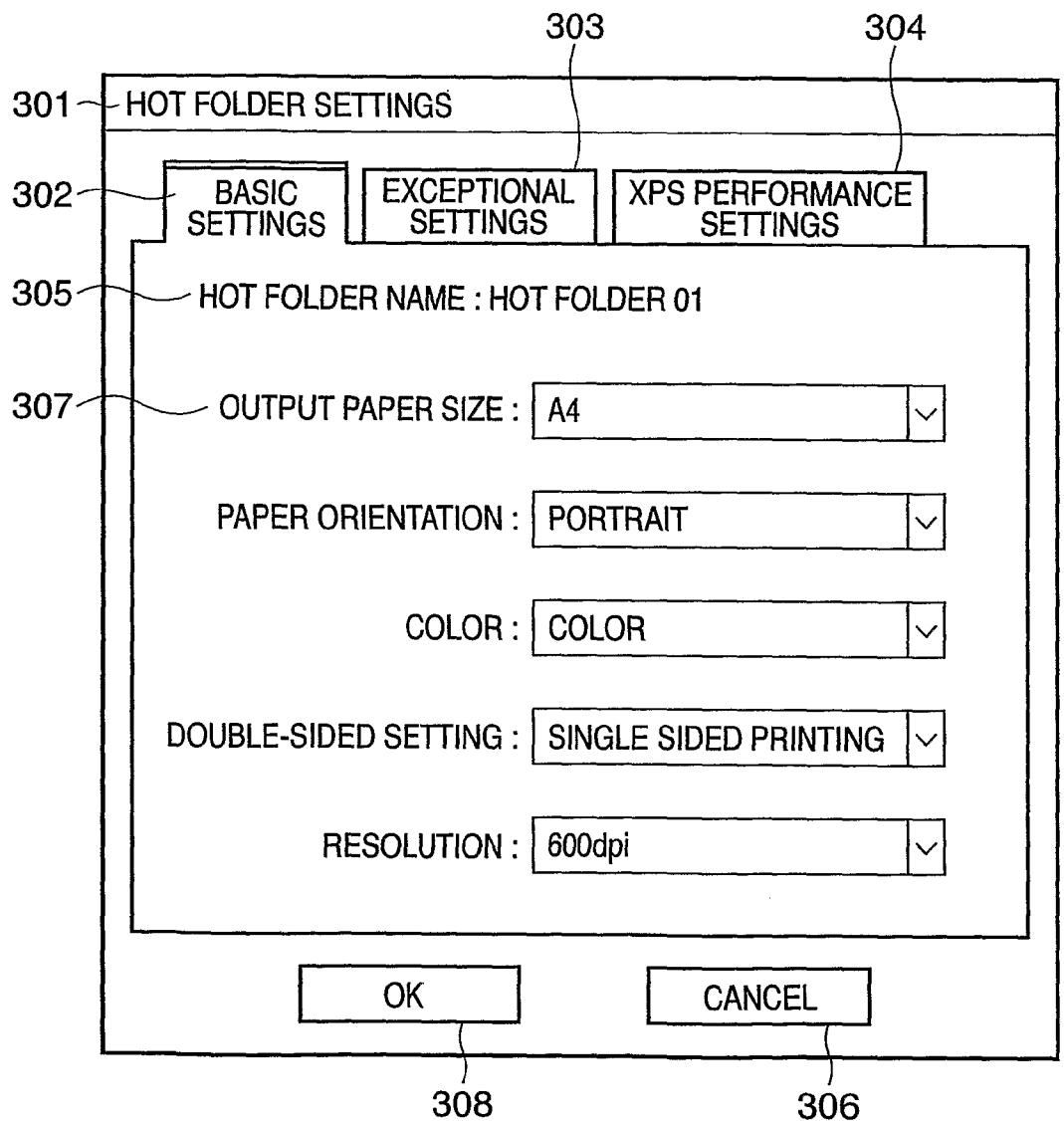
FIG. 3 is a diagram showing an example of a hot folder basic settings screen.

When a user opens the settings screen (not shown in the drawings) by, for instance, right-clicking on a hot folder icon formed on the desktop or elsewhere, the UI control unit 213 displays a settings screen 301 of the type shown in FIG. 3. The settings screen 301 of the present embodiment includes a basic settings sheet 303, an exceptional settings sheet 303, and an XPS performance settings sheet 304. The basic settings sheet 302 includes a hot folder name 305, a basic print settings option region 307, an OK button 308, and a cancel button 306. The basic settings sheet 302 receives the specification of the print settings (the print settings) specified for the entire print job and generated by the hot folder. For instance, in the example screen shown in FIG. 3 an output paper size print setting has been input to give an A4 size.

Figure 4:
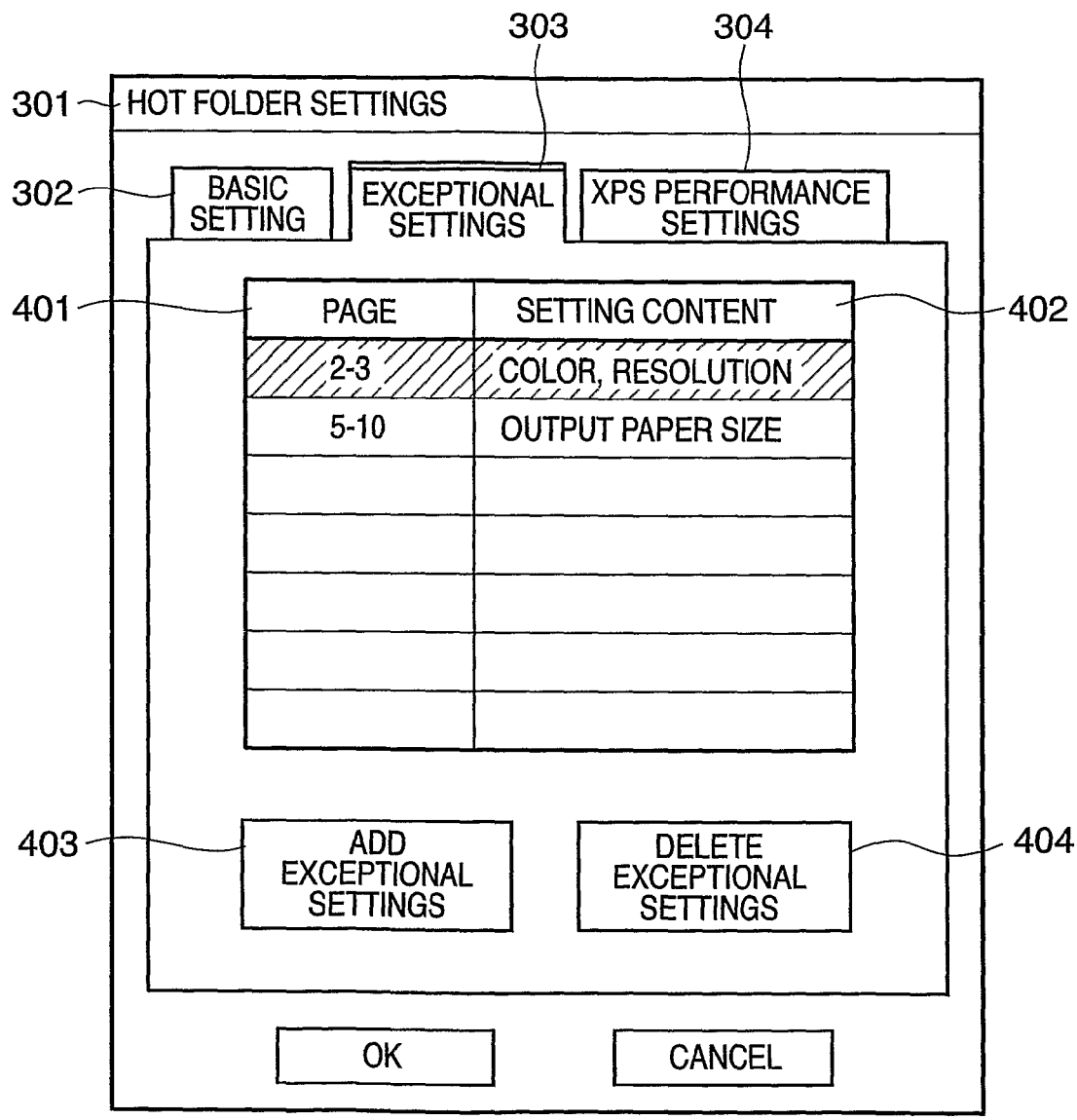
FIG. 4 is a diagram showing an example of an exceptional settings screen.
Figure 5:
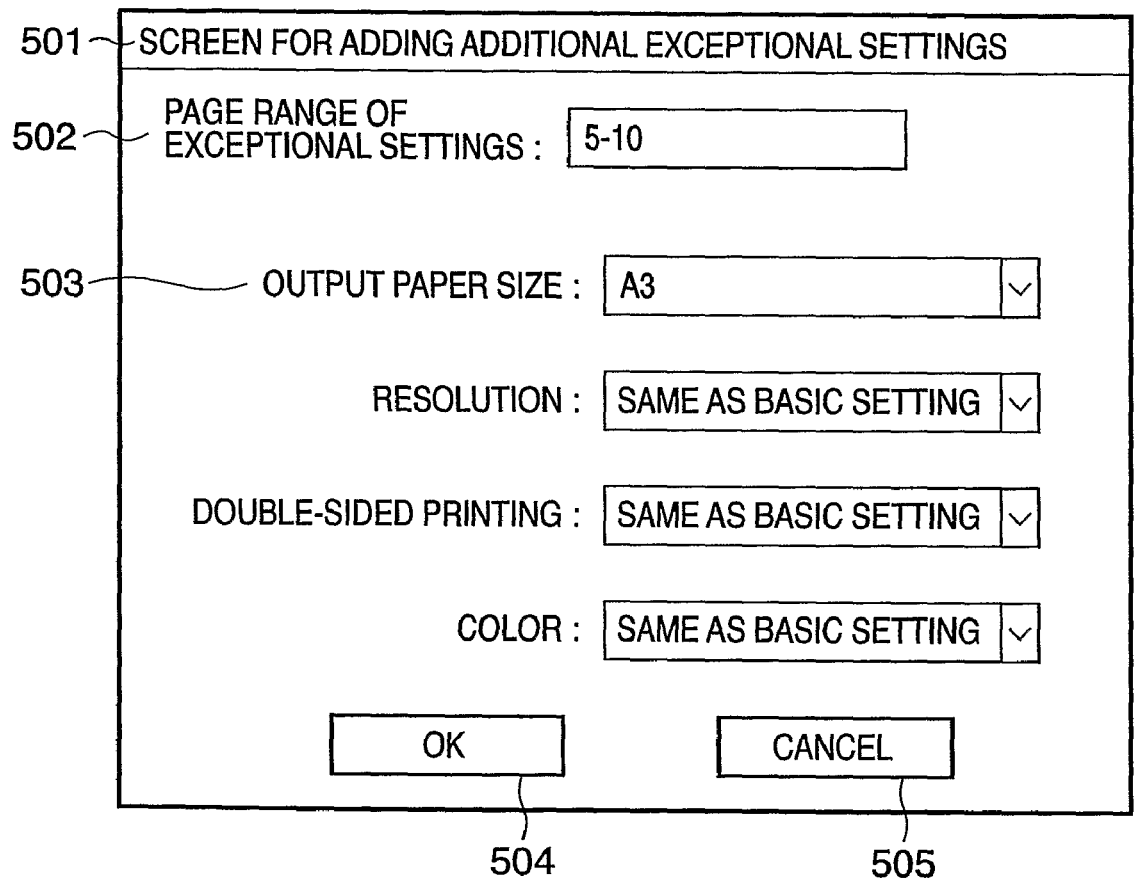
FIG. 5 is a diagram showing an example of an exceptional settings adding screen.

FIG. 4 is an example of the screen of the exceptional settings sheet 303. The exceptional settings are print settings for a particular page from among pages of the basic settings sheet 301 in FIG. 3. The exceptional settings sheet 303 includes an exceptional settings page range displaying region 401, and a setting item displaying region 402 for displaying content of the print setting for each page range. The exceptional settings sheet 303 further includes an add exceptional settings button 403 and a delete exceptional settings button 404. When the add exceptional settings button 403 is pressed, an exceptional settings adding screen 501 of the type shown in FIG. 5 is displayed, thereby allowing exceptional settings to be added. When the delete button 404 is pressed, the selected exceptional settings in the exceptional settings region are deleted. In the example of FIG. 4, exceptional settings have been set for the color and resolution settings for pages 2 and 3 and as the output paper size setting for pages 5 through 10.

The exceptional settings adding screen 501 of FIG. 5 includes an exceptional page range specifying region 502, and an exceptional settings region 503, which allows specification of a page range to which exceptional settings are applied, as well as an OK button 504, and a cancel button 505. In the example screen of FIG. 5, pages 5 through 10 have been specified as the exceptional range, and the corresponding output paper size has been set to an exceptional setting of A3 size. By the user pressing the OK button 504, the setting items of the exceptional settings region 503 are associated with the pages specified in the exceptional page range specifying region 502 and are recorded. The recorded content is displayed in the above-described page range displaying region 401 and the setting item displaying region 402. When print settings are specified to be "the same as the basic settings" in the exceptional settings region 503, the processing is performed using the print settings specified in the basic setting sheet 302.

Figure 6:
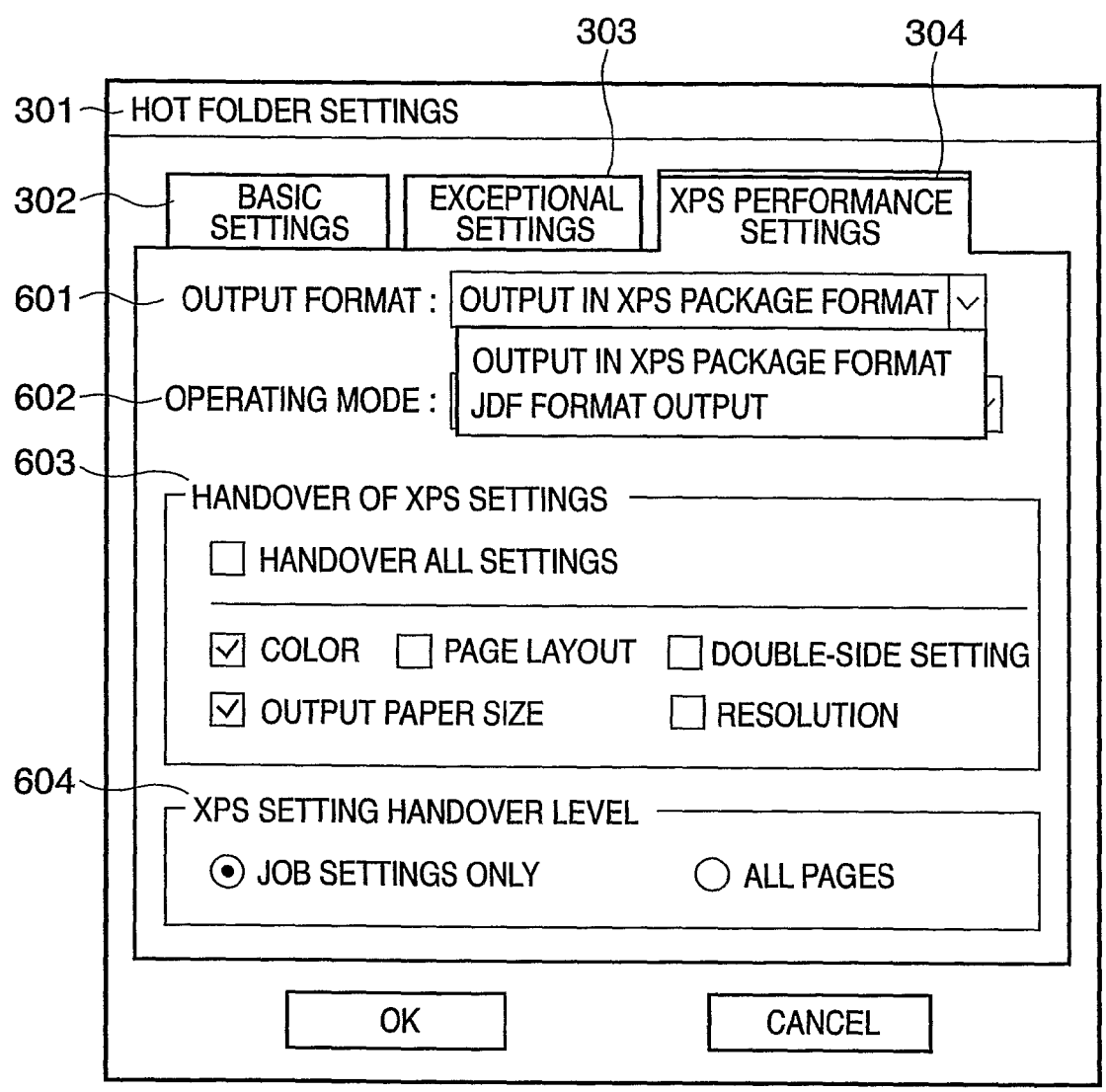
FIG. 6 is a diagram showing an example of a performance setting screen at XPS input.
Figure 7:
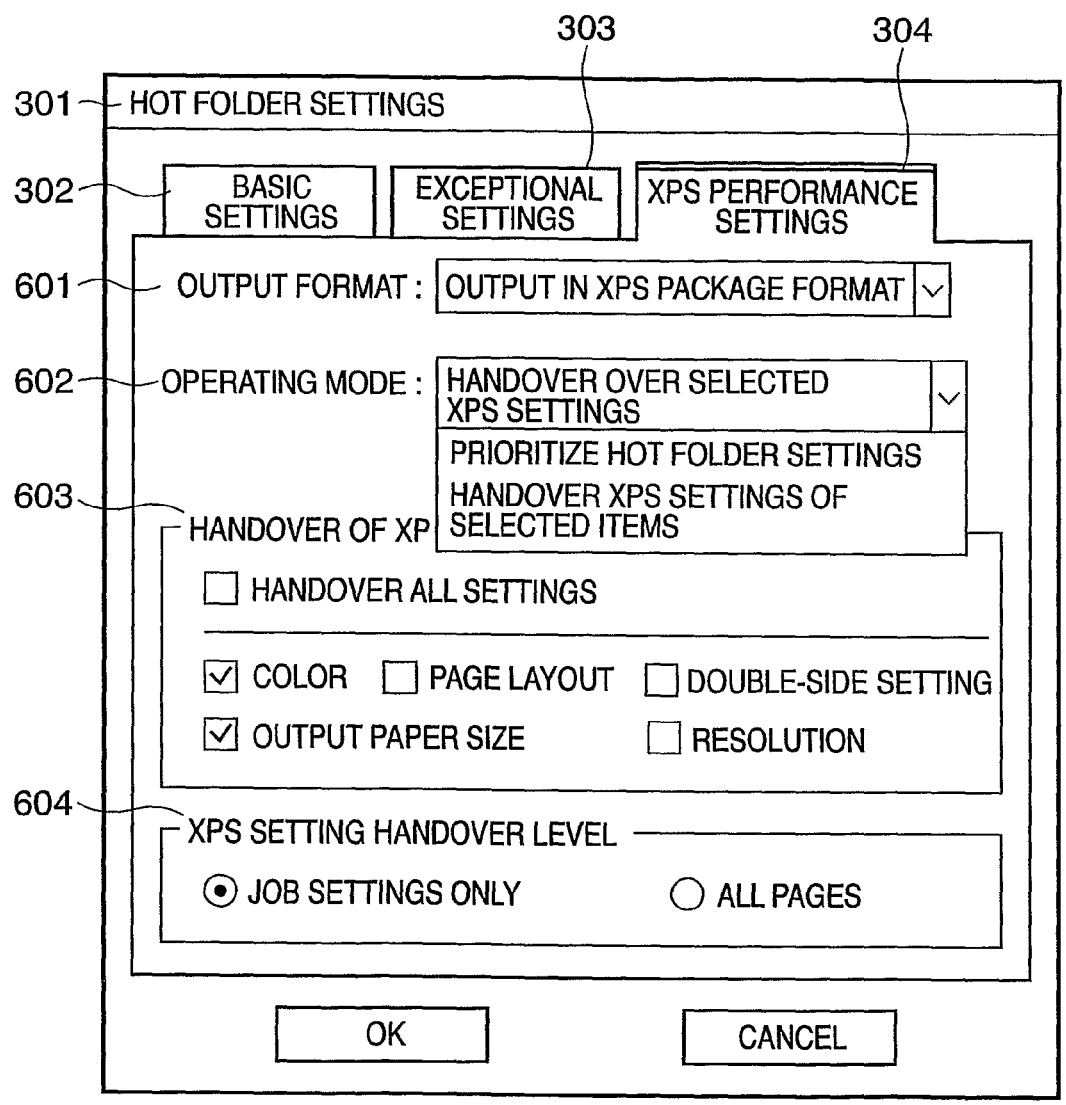
FIG. 7 is a diagram showing an example of the performance setting screen at XPS input.
Figure 13:
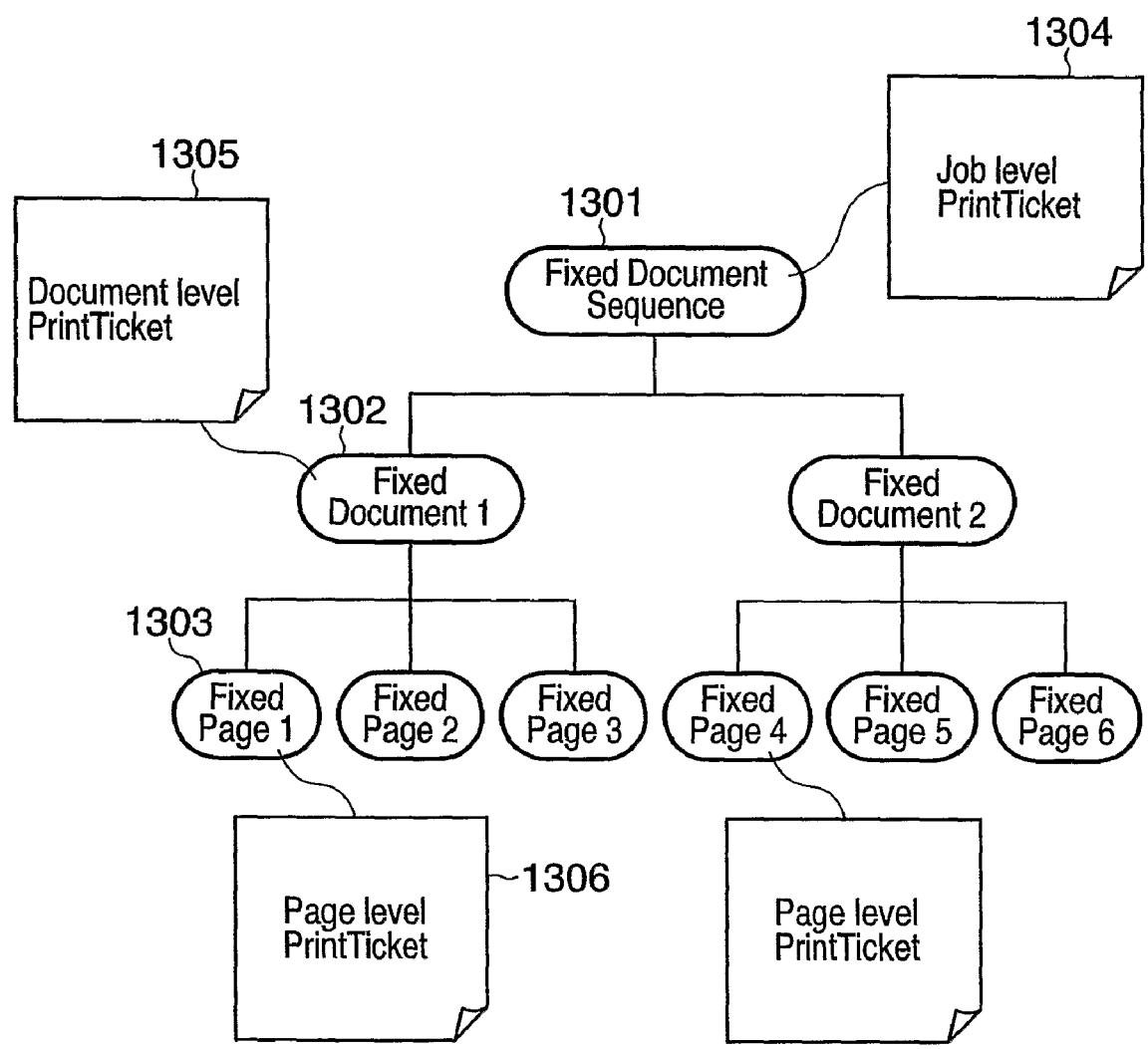
FIG. 13 is a diagram showing XPS document construction.

FIG. 6 is an example of a screen for performing operation settings when the XPS document has been input to the document control unit 201. The document control unit 201 includes an output format specifying unit 601, an operations mode specifying unit 602, a handover item specifying unit 603, and a handover level specifying unit 604. The output form specifying unit 601 is used to specify the format of output to the device when an XPS document has been input to the hot folder. In the present embodiment, it is possible to select either "output in XPS package format" or "output in JDF format". The details of the respective formats are described in a later section. The operations mode specifying unit 602 is used to select whether to hand over the print settings specified in the input XPS document. Specifically, either the "prioritize hot folder settings" or "hand over XPS settings of selected items" of FIG. 7 is selected. When the "hand over XPS settings of selected items" is specified in the mode specifying unit 602, items specified in the handover item specifying unit 603 are handed over from among the print settings. The handover item specifying unit 603 specifies items to be handed over by specifying either "hand over all items" or by separately specifying handover of the "color setting", the "output paper size setting" and the like. In the example of FIG. 6, the handover item specifying unit 603 has been set for handover of the "color setting" and the "output paper size setting". When "hand over XPS settings of selected items" has been selected using the operations mode specifying unit 602, the handover level specifying unit 604 is used to select which level of settings of the XPS document to handover. When "job settings only" is selected, only the job level (i.e. the document data level) print setting 1304 within the XPS document shown in FIG. 13 is handed over. In this case, the exceptional settings are not handed over. On the other hand, when "all pages" is selected, the print settings (also known as attributes) 1306 associated with every FixedPage in the input XPS document are handed over. In other words, all print settings are handed over, including the exceptional settings.

As described above, in addition to setting the basic print settings and the exceptional print settings, it is possible, using the hot folder settings, to specify handover settings relating to the handover of internal print settings from within the XPS document. The handover setting can be set to a first handover setting or a second handover setting. According to the first handover setting, printing is performed in accordance with the external print settings alone, and without handing over the hot folder print settings, which is to say the internal print settings. According to the second handover setting, internal print settings are handed over, and it possible to select between settings according to which all or only some of the internal print settings are handed over. Moreover, according to the second handover setting, it is possible to select a handover level. Using the handover level, it is possible to select whether to hand over only the print settings of the entire job or to hand over the print settings of the entire job and the exceptional print settings of all of the pages.

<Processing by the Hot Folder Setting Control Unit>

Figure 8:
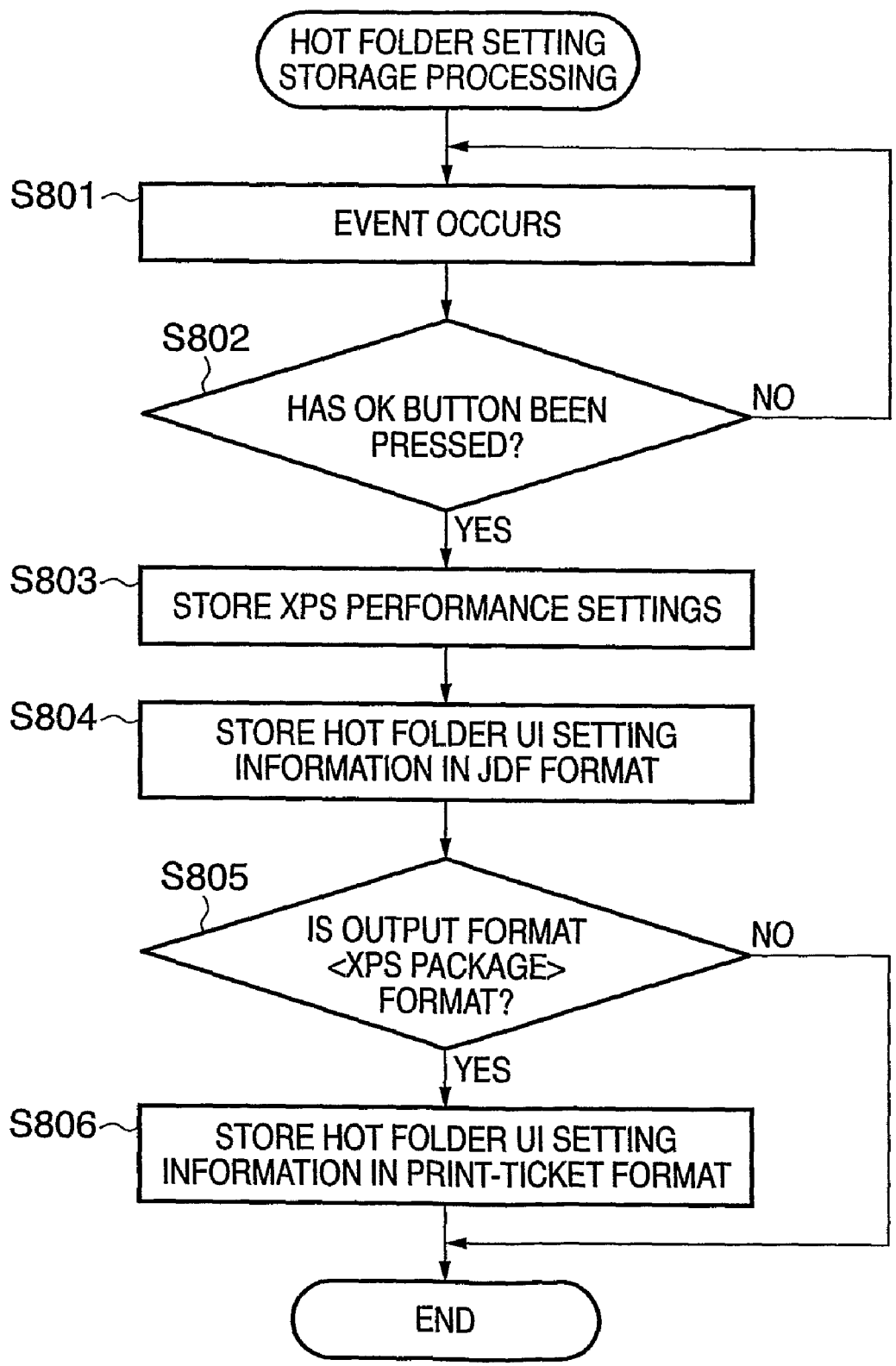
FIG. 8 is a flowchart of a hot folder setting storage process.

FIG. 8 shows a flowchart of processing performed by the hot folder setting control unit 202 to store the content of the settings screens when setting using the settings screens of FIGS. 3 and 7 has been completed and the OK button 308 has been pressed. When, in step S801, an event occurs on the hot folder settings screen 301, a processor determines, in step S802, whether the event was a pressing of the OK button. Upon determining that the event was a pressing of the OK button, the processor proceeds to the step S803. Upon determining, in step S802, that the event was not a pressing of the OK button, the processor returns to the event-waiting state of step S801.

In step S803, an XPS hot folder performance setting storage unit 214 stores the set content of the XPS performance settings sheet 304 in the XPS performance settings 216. The content of the XPS performance settings 216 is shown in FIGS. 6 and 7, and may be summarized as follows.

(1) Output format: XPS package or JDF format. This may be seen as a selection between setting the output format to be the document data in an original form, or to be the document data appended with print settings.

(2) Operating mode: either a hot folder settings (external print settings) prioritizing mode or an XPS print settings (internal print settings) handover mode.

(3) Handover items: specifies items to be handed over (all items or only specified individual items)

(4) Handover level: job level (i.e., document level) or page level. This indicates whether the handover level is the level at which the exceptional print settings are handed over.

Figure 16:
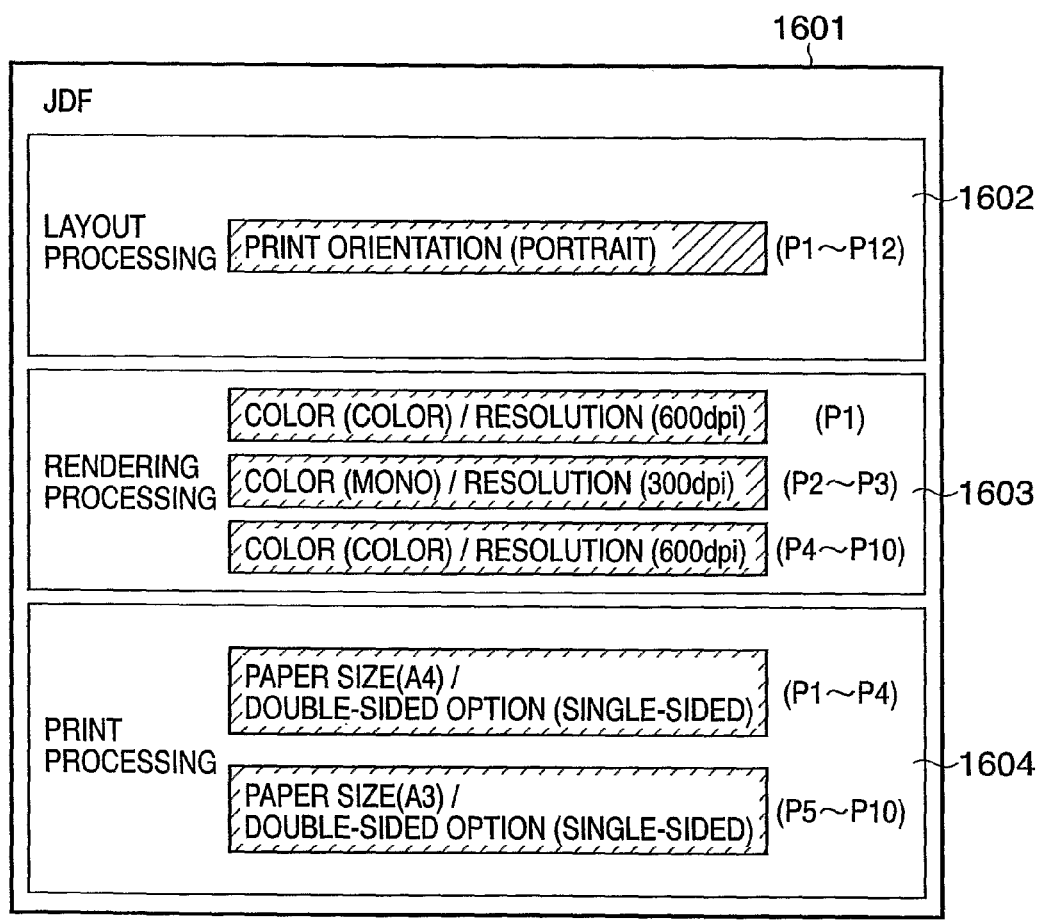
FIG. 16 is a diagram showing an example of a JDF storing print settings of the hot folder.

In step S804, the processor stores the print setting content specified for the hot folder settings in the JDF data 218. The stored content is the content set in the basic settings sheet 302 and content set in the exceptional settings sheet 303. For the basic settings and the exceptional settings of the example UI screen in FIGS. 3 and 4, a JDF of the type shown in the example of FIG. 16 is stored. The JDF 1601 of FIG. 16 includes a layout processing setting 1602, a rendering processing setting 1603, and a print processing setting 1604. Note that in FIG. 16, "Px" indicates a page number. The layout processing setting 1602 is used as the basic settings for all pages and specifies that the print orientation should be "portrait" for all the pages. The rendering processing setting 1603 is used as the basic setting to set the color setting to "color" and the resolution setting to "600 dpi". As exceptional settings, the color setting and resolution for pages 2 and 3 are set to "mono" and "300 dpi" respectively. JDF (Job Definition Format) is job control information defined using XML, and includes print settings and the like.

Figure 15:
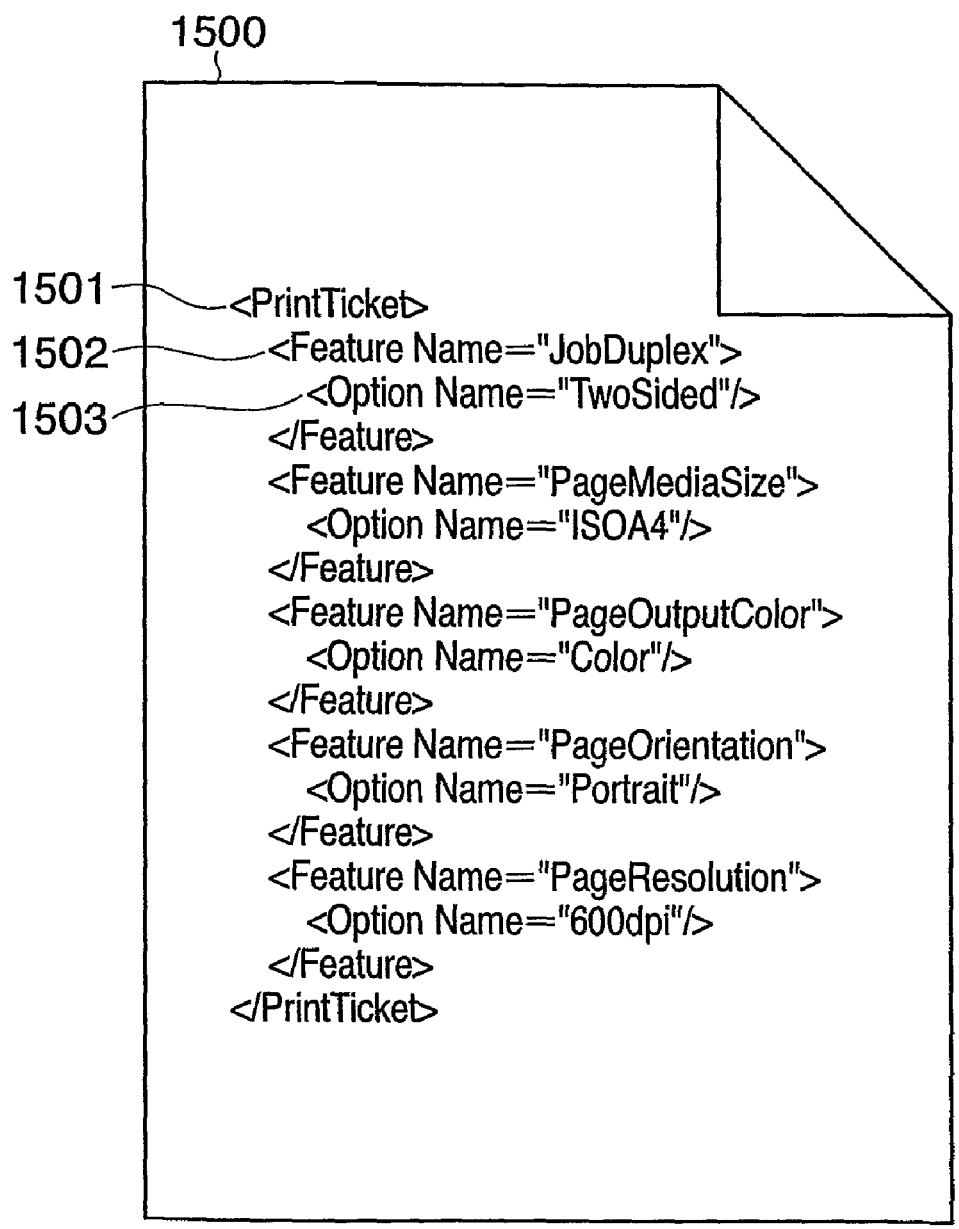
FIG. 15 is a diagram showing an example of a print ticket.

In step S805, the output format specifying unit 601 of the XPS performance setting sheet 304 determines the specified output format. When "output in XPS package format" has been selected, the processor proceeds to step S806. When not selected, the processor terminates processing. In step S806, the print setting format generating unit 215 stores the basic settings 302 content in the print ticket 217, and terminates processing. In the case of the example screen of FIG. 3, a print ticket of the type shown in FIG. 15 is generated. The print ticket is also data defined using XML. The print ticket 1500 includes a PrintTicket Tag 1501 having a plurality of Feature specifying units 1502. Each Feature specifying unit 1502 is a setting item. An Option specifying unit 1503 shows a setting value corresponding to the setting item of the Feature specifying unit 1502.

In the example of FIG. 15, the following items, which have been specified on the basic settings screen, are stored.

<Feature Name = "JobDuplex">: double-sided setting
<Option Name = "TwoSided">: double-sided printing
<Feature Name = "PageMediaSize">: paper size setting -continued <Option Name = "ISO A4">: A4 size
<Feature Name = "PageOutputColor">: color printing setting
<Option Name = "Color">: color printing
<Feature Name = "PageOrientation">: page orientation setting
<Option Name = "Portrait">: portrait
<Feature Name = "PageResolution">: resolution setting
<Option Name = "600dpi">: 600 dpi According to the above procedure, the print settings input using the hot folder UI are stored in print ticket format if the XPS package is selected as the output format and in JDF format if the JDF format is selected as the output format.

<Processing by the Hot Folder Input Document Control Unit>

Figure 9:
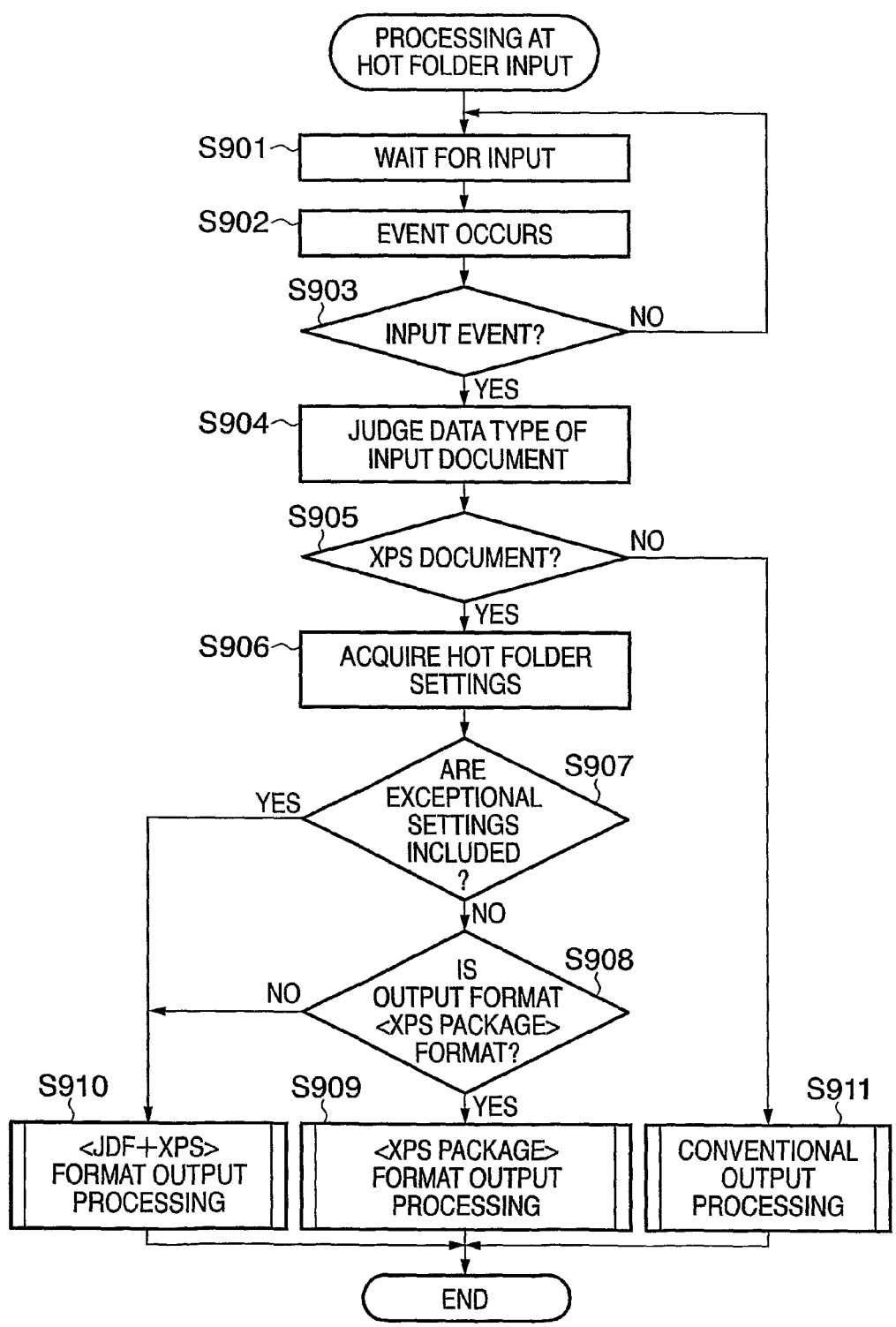
FIG. 9 is a flowchart of a hot folder input process.

The following describes operations of the input document control unit 201 of the hot folder manager 200 of the present embodiment. FIG. 9 shows the flow of processing when a document is input to the hot folder. In step S901 the document receiving unit 203 enters an input-awaiting state. In step S902, an event occurs, and the document receiving unit 203 determines, in step S903, whether the event of step S902 is a document input event. Upon determining in step S903 that the event is the input event, the processor proceeds to step S904. On the other hand, upon determining that the event is not an input event, the processor proceeds to step S901 and reenters the waiting state.

In step S904, the input document determination unit 205 determines the data type of the input document, and proceeds to step S905. In step S905, the processor determines whether the determined data type of the input document is the XPS document data type. Upon determining in step S905 that the data type is the XPS document data type, the processor proceeds to step S907. On the other hand, upon determining, that the determined data type is a data type other than the XPS document data type, the processor proceeds to step S911. Data types other than the XPS document data type include data types conventionally supported by the hot folder such as PDF, TIFF, and PostScript. It can be determined whether a given document file is an XPS document using, for instance, by using an XML tag attached to the head of the document. In step 911, conventional output processing is executed by the PDF control unit 206 and the TIFF control unit 205.

Figure 12:
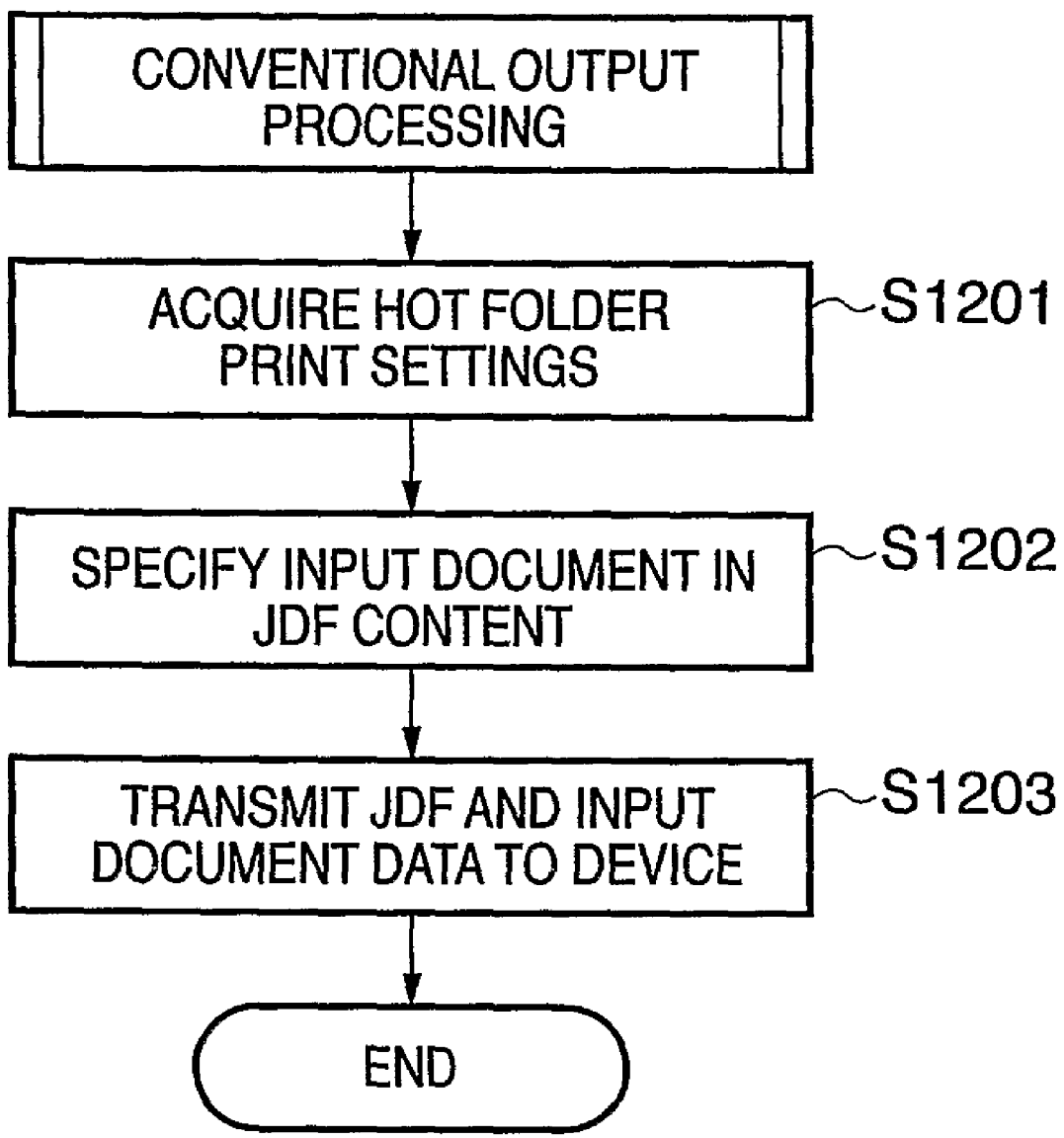
FIG. 12 is a conventional output process flowchart.
Figure 18:
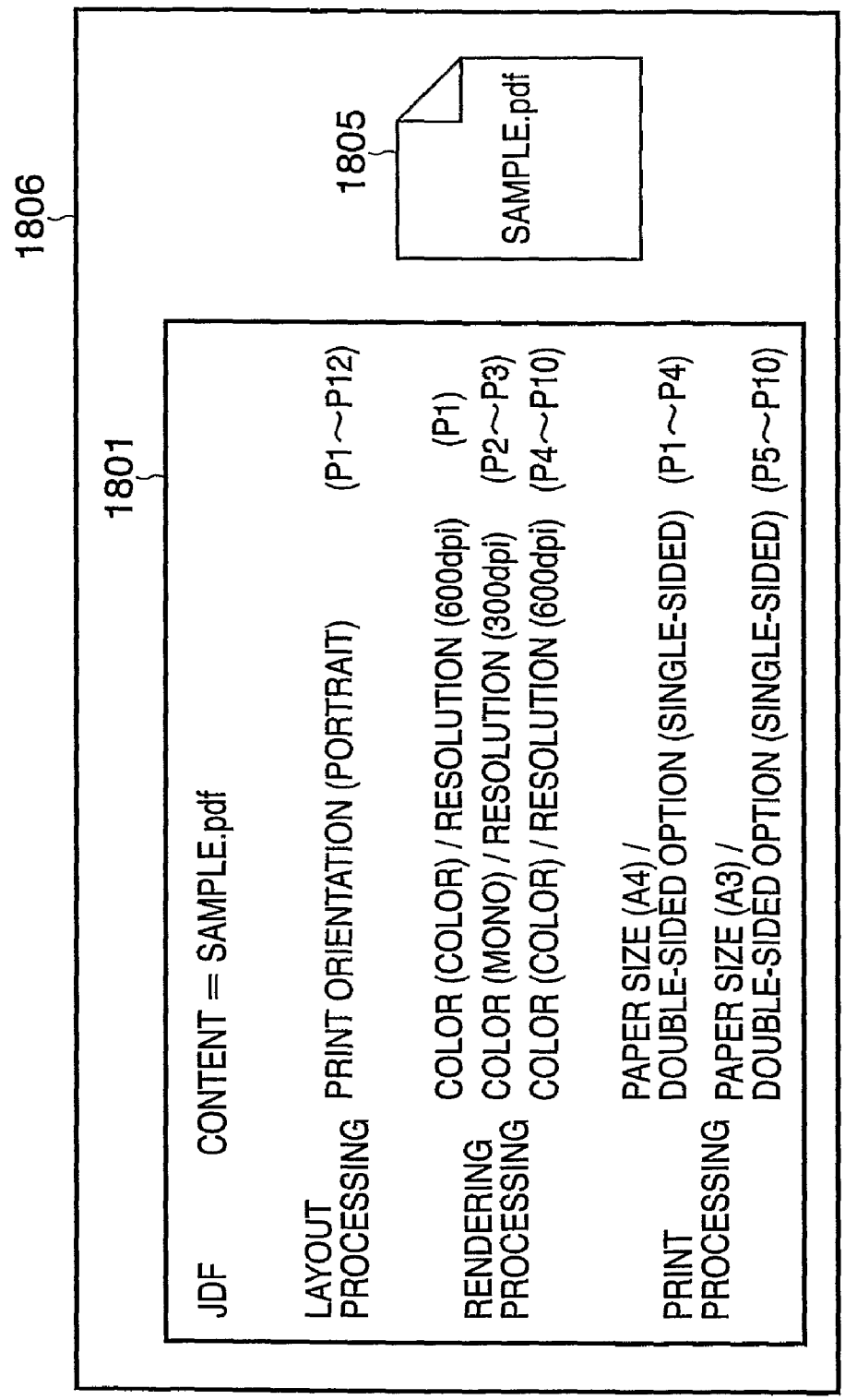
FIG. 18 is a diagram showing an example of the JDF in which PDF has been specified as content data.

FIG. 12 is a flowchart showing conventional hot folder output processing. In step S1201, the processor acquires JDF data 218 stored by the settings control unit 202. In step S1202, the processor specifies the document data input to the document receiving unit 203 as JDF content (i.e., a document file which is to be printed) acquired in step S1201, and generates a print job. FIG. 18 shows an example of a case in which a PDF file (SAMPLE.pdf) has been specified as JDF data 1801 content stored in the JDF data 218. In step S1202, the processor describes an identifier of content data 1805 in the JDF data 1801. In step 1203, the processor transmits package data 1806 formed by packaging the PDF data 1805 and the JDF data 1801 to the device 103, and terminates processing. This package data is the data of the print job.

The following describes processing for the other case in which the data type is determined, in step S905 shown in FIG. 9, to be the XPS document data type. In step S906, the processor acquires the XPS performance settings 216. When the XPS performance settings 216 are not acquired, it is sufficient that the content of the XPS performance settings 216 can be accessed. In step S907, the processor consults either the PT data 217 or the JDF data 218 based on the output format setting in the XPS performance settings 216, and determines whether settings values are present in the exceptional settings items. In step S908, the output format determination unit 208 determines whether the settings value of the output format specifying unit 601 in the XPS performance settings 216 is "output in XPS package format". Upon determining in step S908 that the settings value is "output in XPS package format", the processor proceeds to step S909. On the other hand, Upon determining in step S909 that the settings value is not "output in XPS package format", the processor proceeds to step S910. In step S909, the processor executes output processing for the XPS package format.

Figure 10:
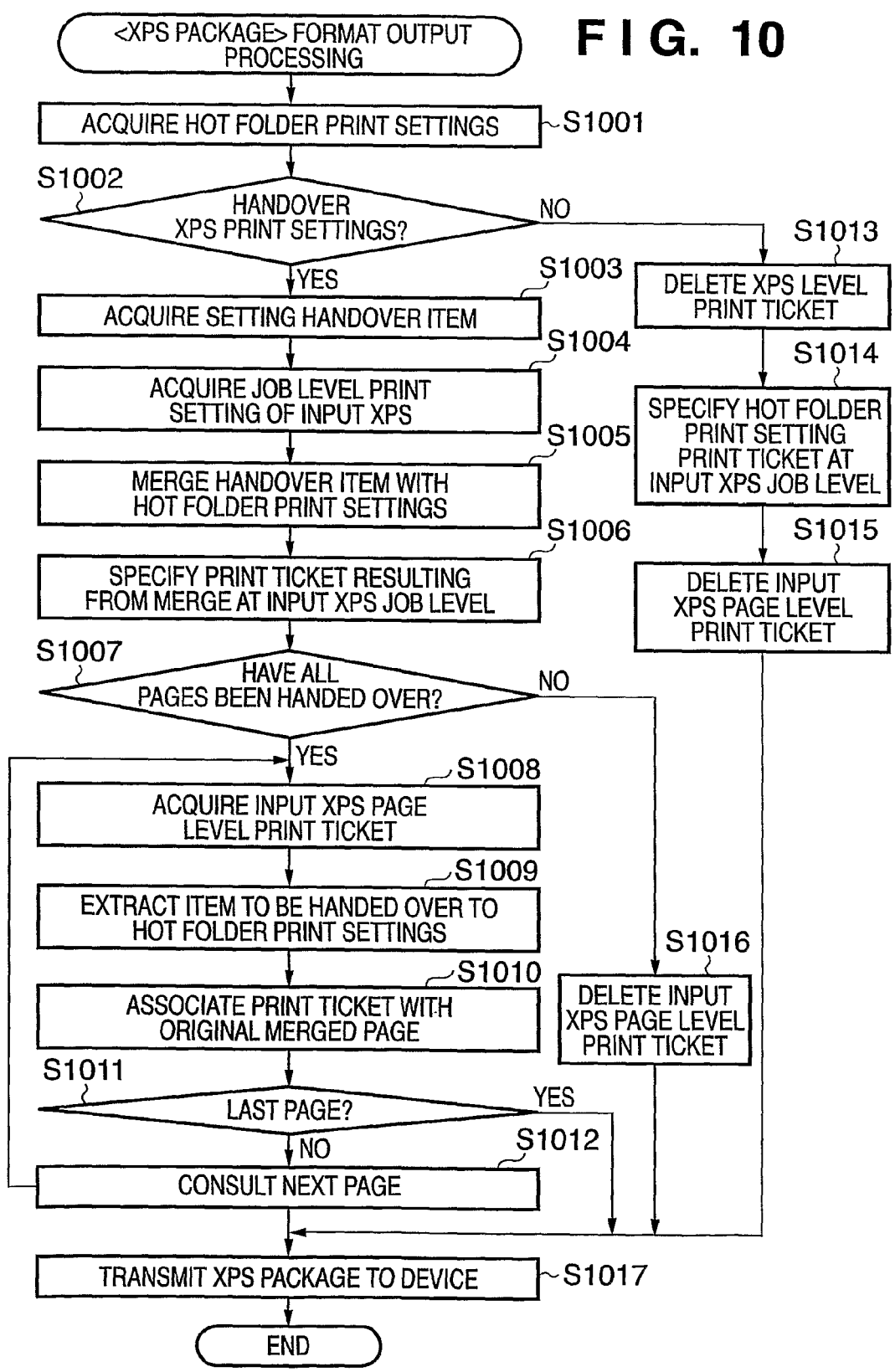
FIG. 10 is an output process flowchart for an XPS package format in a first embodiment.

The XPS package format output processing in step S909 is described below with reference to the flowchart of FIG. 10. In step S1001, the processor acquires the print settings PT data 217 of the hot folder, which have been stored in the print ticket format. In step S1002, the processor determines whether the handover setting of the print settings of the input XPS print document has been set in the XPS performance settings 216 acquired in step S907. When the handover setting in the print settings of the XPS print document has not been set (i.e., when "prioritize the hot folder settings" has been specified in operating mode specifying unit 602), the processor proceeds to step S1013.

Figure 14:
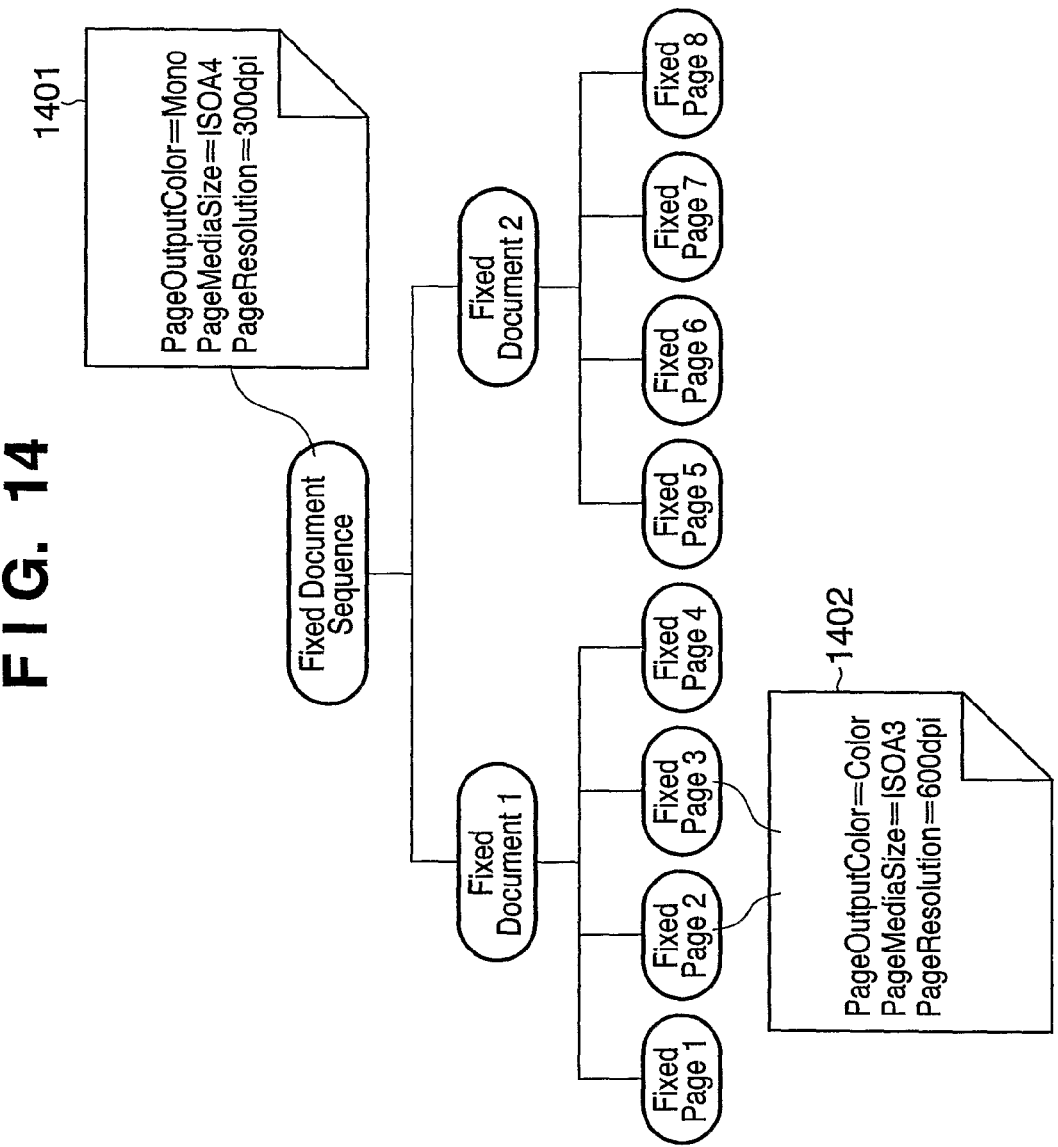
FIG. 14 is a diagram showing an example of print settings for an XPS document.
Figure 20:
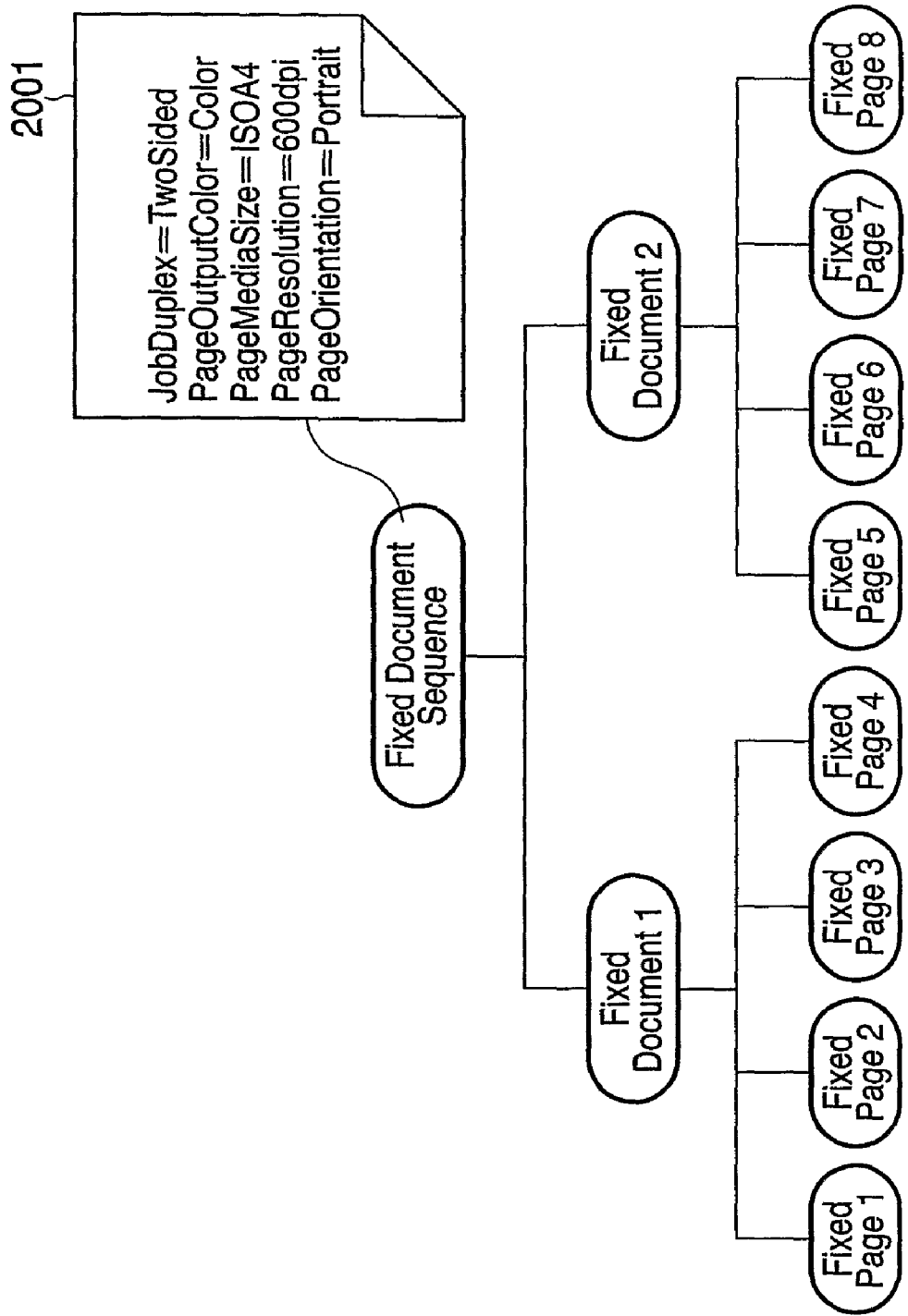
FIG. 20 is a diagram showing an example of an XPS document after hot folder print settings have been merged with the print settings of the input XPS document.

In step S1013, the processor deletes a job-level XPS document print ticket 1401 of the type shown in FIG. 14. Here, a "job-level print setting" refers to the print ticket 1401, shown in FIG. 14, which is associated with the FixedDocumentSequence node of the XPS document. In step S1014, the print ticket 217 is associated with the FixedDocumentSequence of the input XPS document in place of the deleted print ticket. The print ticket 217 is the data stored in step S806 of FIG. 6. Further, in step S1015, the processor deletes all of the FixedPage level print tickets belonging to the input XPS document. As a result, the processor generates an XPS document, of the type shown in FIG. 20, that only has the print ticket associated with the FixedDocumentSequence node. In step S1017, the processor transmits the generated XPS document to the printer device, and terminates processing.

On the other hand, upon determining in step S1002 that the print settings of the input XPS document are to be handed over, the processor proceeds to step S1003. In step S1003, the processor acquires the handover items specified by the handover item specifying unit 603 from the XPS performance settings 216. In the case of the example screen of FIG. 6, "color" and "output paper size" are acquired as handover items in the manner described below.

[Handover Items]
<PageOutputColor>
<PageMediaSize>

In step S1004, the processor acquires the job level print settings of the input XPS document. For instance, the following print settings are associated with the print ticket 1401 which is an example of the job level print settings.

Figure 21:
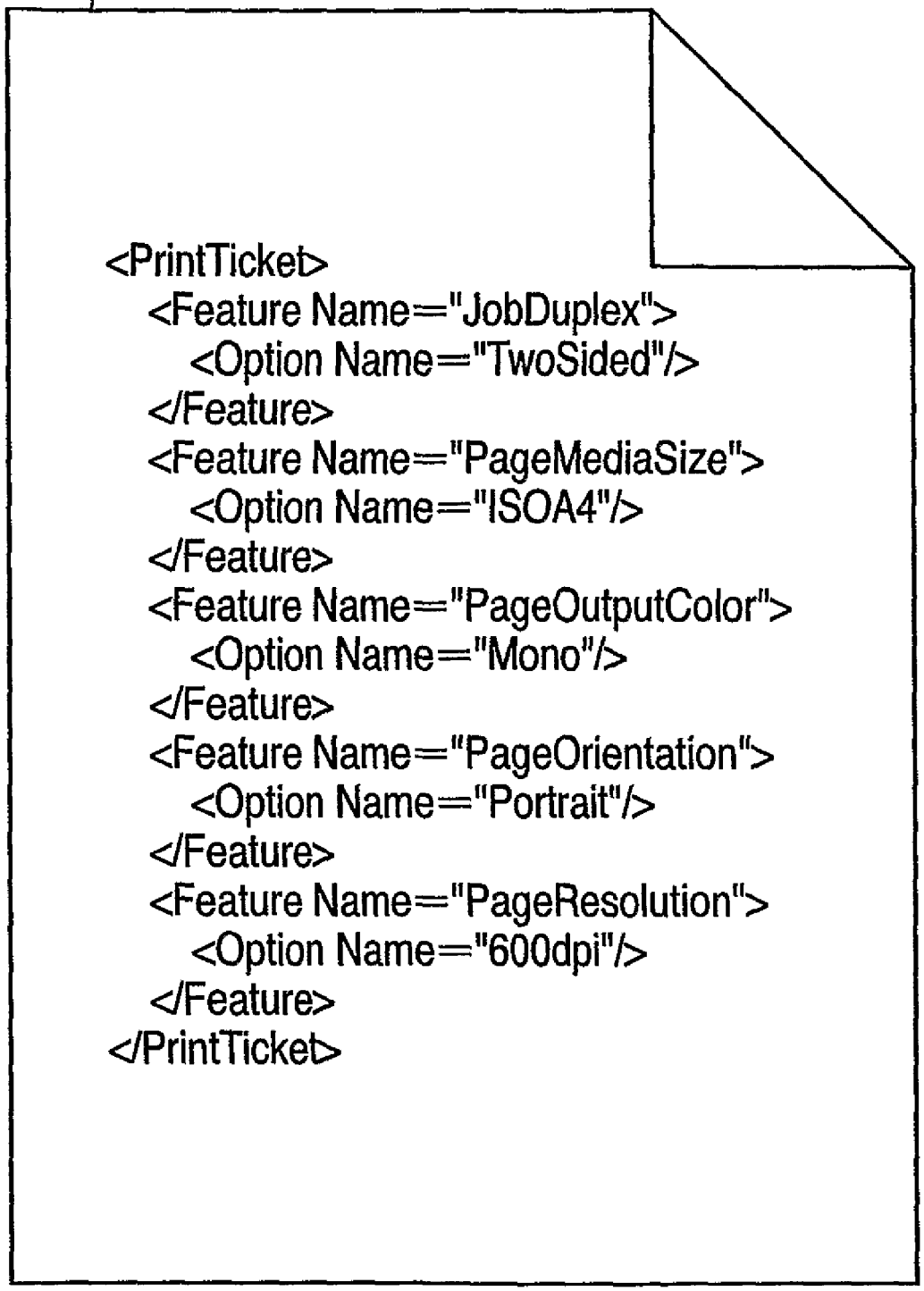
FIG. 21 is a diagram showing an example of a print ticket after hot folder print settings have been merged with the print settings of the input XPS document.

<Feature Name = "PageMediaSize">...paper size setting
<Option Name = "ISOA4">...A4 size
<Feature Name = "PageOutputColor">...color setting
<Option Name = "Mono">...monochrome printing
<Feature Name = "PageResolution">...resolution setting
<Option Name = "300dpi">...300 dpi In step S1005, from among the print settings acquired in step S1004, the processor merges only the specified handover items acquired in steps S1003 with the hot folder print PT data 217. The print ticket obtained by merging the input XPS document job level print ticket 1401 of FIG. 14 and the print ticket 1500 of FIG. 15 is the print ticket 2100 of FIG. 21. In the input document print ticket 1401, the PageOutputColor and the PageMediaSize, which are the handover items, are handed over to the print ticket 2100. In this merge processing, when the same items are present in the print settings of the merged side (the hot folder print settings) and on the merging side (the XPS document print settings), the print settings values of the respective items are switched to the print setting value on the merging side. When the same items are not present, the items on the merging side are added to the print settings on the merged side.

Figure 22:
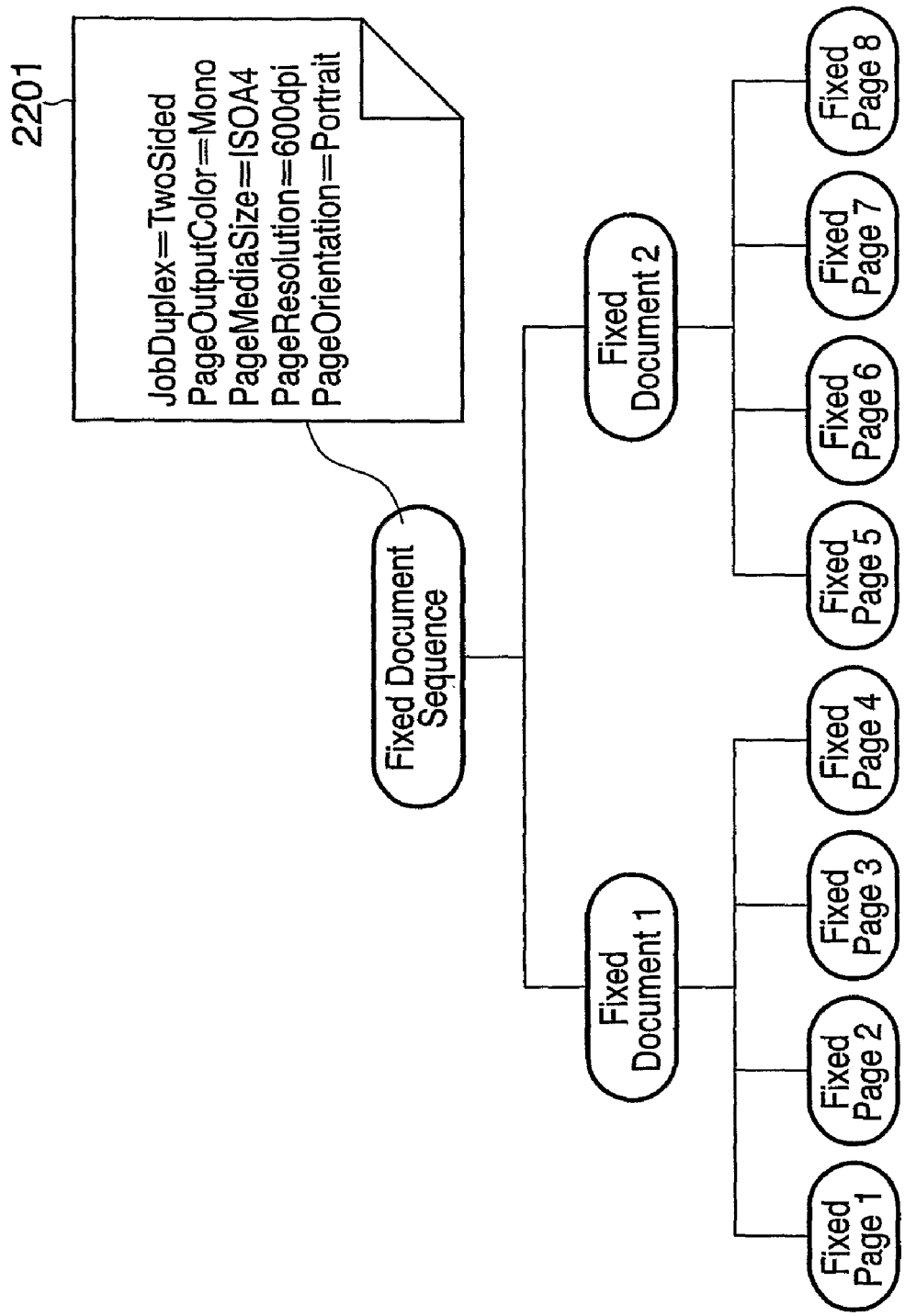
FIG. 22 is a diagram showing an example of the XPS document after hot folder print settings have been merged with the print settings of the input XPS document.

In step S1006, the processor deletes the job level print ticket 1401 of the input XPS document, and then associates the newly created print ticket 2100 with the job level. Next, in step S1007, the processor determines whether to hand over the settings for all pages. To do this, the processor determines whether "all pages" has been specified in the handover level specifying unit 604 of FIG. 6 using the XPS performance settings 216 acquired in step S907. Upon determining that "all pages" has not been specified, the processor proceeds to step S1016. In step S1016, the processor deletes all print tickets associated with the page level print settings (i.e., the FixedPages) in the input XPS document. In the example of the input XPS document of FIG. 14, the print ticket 1402 is deleted. Consequently, an XPS document is generated having, at the job level, a print ticket 2201 of the type shown in FIG. 22 resulting from the merging of the input document XPS settings and the hot folder print settings. The processor then transmits the XPS document generated in step S1017 to the print device.

On the other hand, upon determining in step S1007 that all the print settings are to be handed over, the processor proceeds to step S1008, and acquires the print ticket of the first page of the input XPS document. Next, in step S1009, the processor extracts, from the print ticket acquired in step S1008, only the print settings corresponding to the handover items acquired in step S1003. In step S1010, the processor deletes the original print ticket acquired in step S1008 from the relevant page, and associates the print ticket, which includes only the handover print settings extracted in step S1009, with the same page. Next, in step S1011, the processor determines whether the presently consulted page is the last page, and upon determining it is not, consults the next page in step 1012 and repeats step S1008. Note that for pages without an associated print ticket, there are no print settings to be handed over, and so the processor may move from step S1008 to step S1011.

When, on the other hand, determining in step S1011 that the consulted page is the last page, the processor proceeds to step S1017, and transmits, to the device, an XPS document with associated print tickets that include settings values inherited from the specified items in all pages of the input XPS document.

Figure 23:
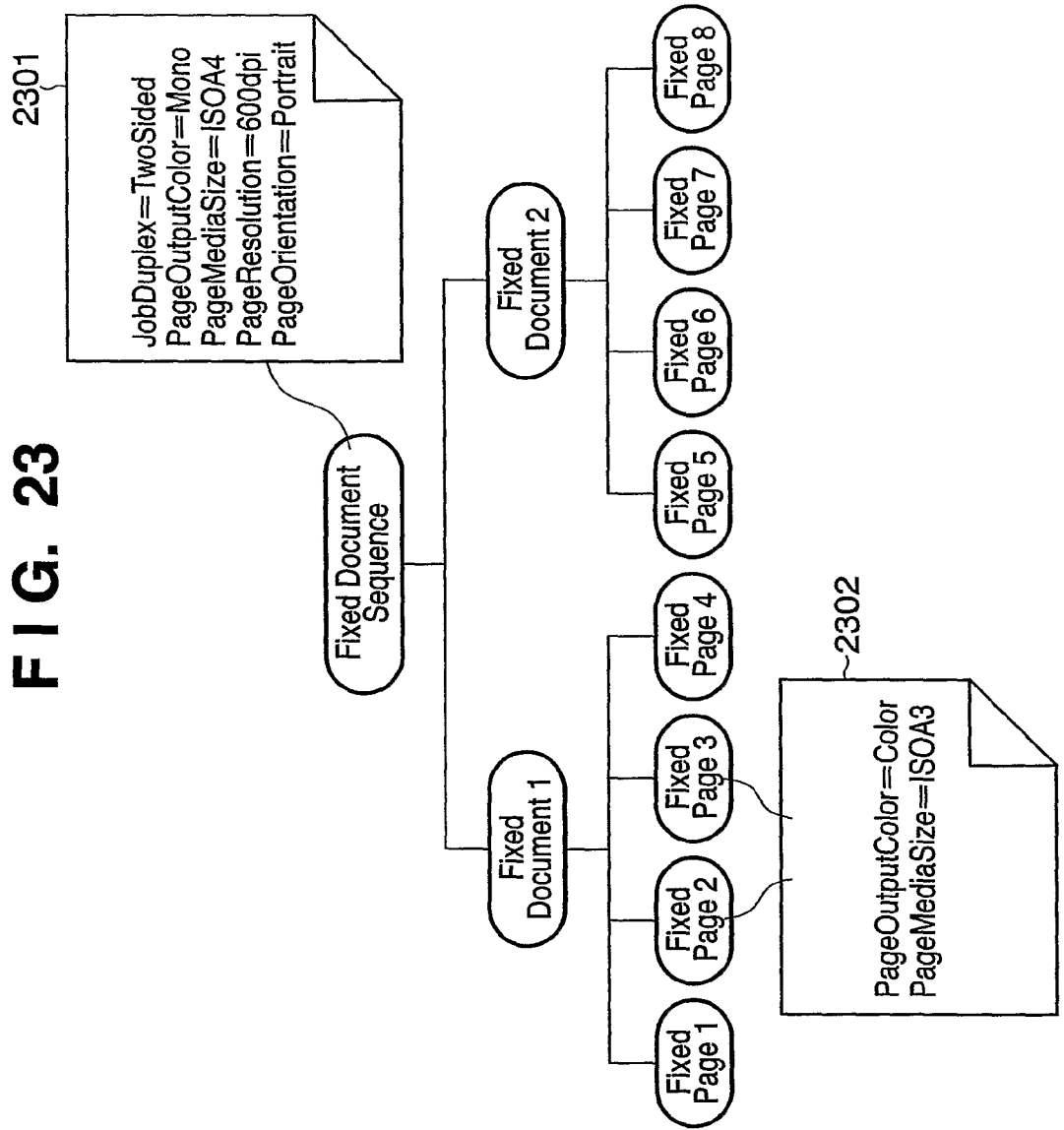
FIG. 23 is a diagram showing an example of the XPS document after hot folder print settings have been merged with the print settings of the input XPS document.

FIG. 23 is an example of the XPS document created by the handover of only the specified items on the print tickets associated with all pages of the XPS print document shown in FIG. 14. In the print ticket 2301 of the FixedDocumentSequence, the PageOutputColor and PageMediaSize items specified for handover have been merged from the print ticket of the input original XPS document. It can be seen that only the specified items from the print tickets associated with the FixedPage2 and the FixedPage3 have been handed over to the print ticket 2302. For the FixedPage2 and the FixedPage3, only the PageOutputColor and the PageMediaSize have been specified as exceptional settings, while other items follow the settings of the job level print ticket 2301.

Figure 11:
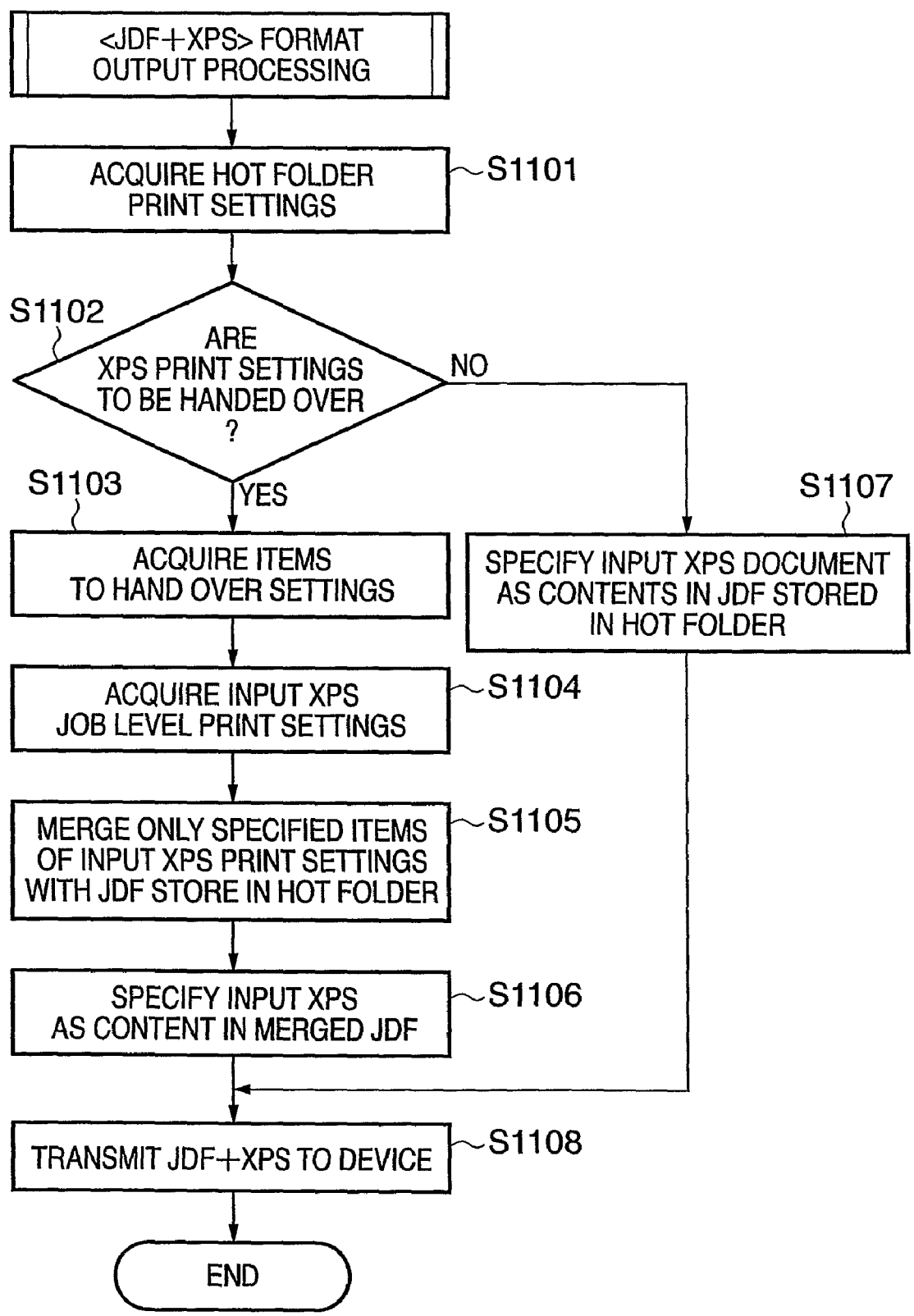
FIG. 11 is an output process flowchart for a JDF format in the first embodiment.

The following returns to the description of FIG. 9. In step S910, the processor executes JDF+XPS format output processing. The JDF+XPS format output processing is described below with reference to the flowchart of FIG. 11.

Figure 19:
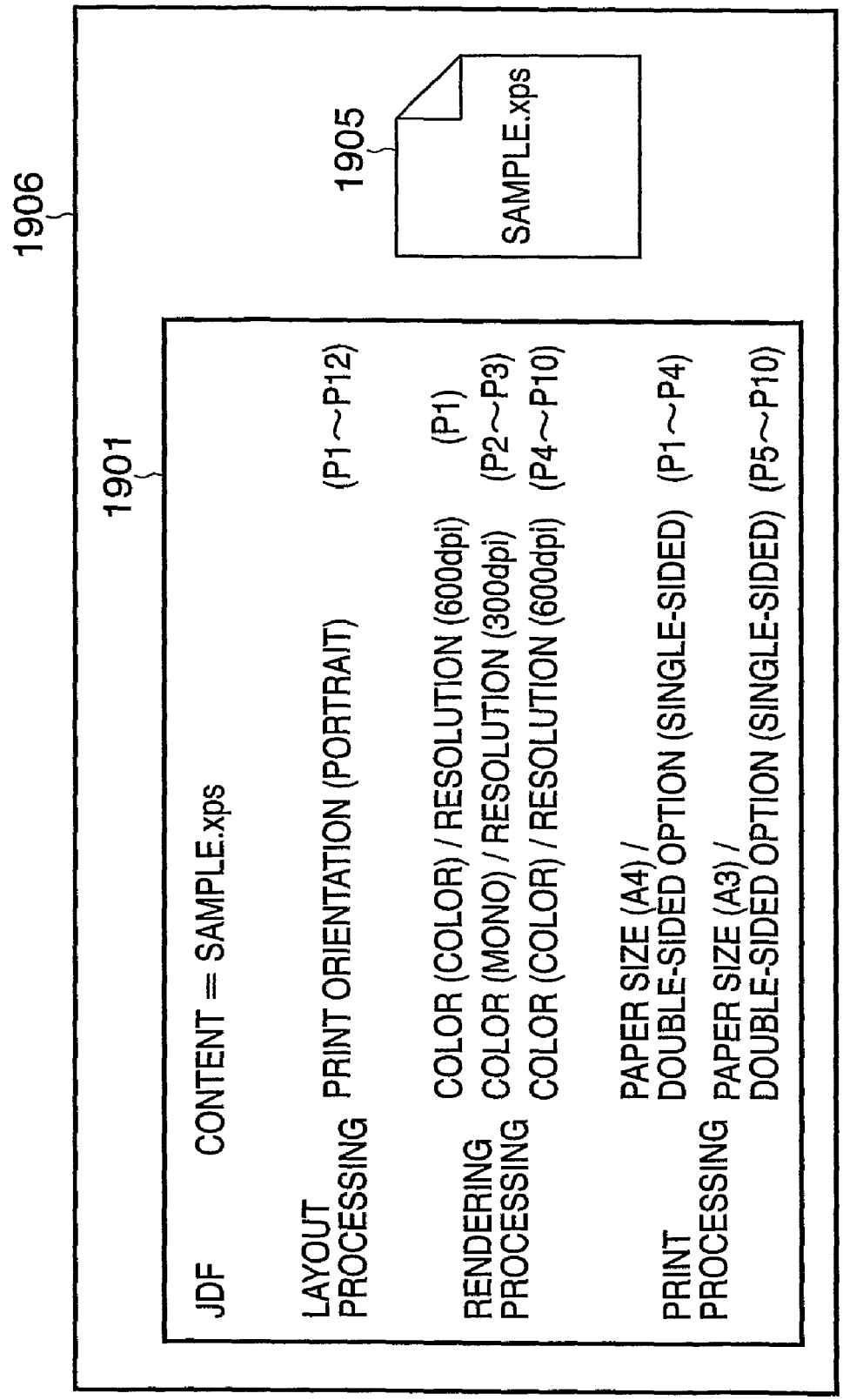
FIG. 19 is a diagram showing an example of the JDF in which XPS has been specified as content data.

In step S1101, the processor acquires the JDF data 218 which includes print settings specified in the hot folder. The processor then proceeds to step S1101 and determines whether the hot folder setting for handover of the print settings of the input XPS document has been set in the XPS performance settings 216 acquired in step S907. When the setting for handover of the XPS print settings has not been set, the processor proceeds to step S1107. In step S1107, the processor specifies the XPS document input to the JDF data 218 as content, and generates JDF data 1901 of the type shown in the example of FIG. 19. The processor further transmits, in step S1108, package data 1906 composed of the JDF and XPS document 1905 to the device, and then terminates processing.

When, on the other hand, there is an instruction to hand over the print settings of the XPS document, the processor proceeds to step S1103. In step S1103, the processor acquires from the XPS performance settings 216 the handover items specified in the handover item specifying unit 603. In the case of the example of FIG. 6, the processor acquires "color" and "output paper size" as the handover items.

[Handover Items]
<PageOutputColor>
<PageMediaSize>

Next, in step S1104, the processor acquires the job level print settings (print ticket) of the input XPS document. For instance, the following print settings are associated with the job level print ticket 1401.

```
<Feature Name = "PageMediaSize">...paper size
   setting
   <Option Name = "ISOA4">...A3 size
<Feature Name = "PageOutputColor">...color setting
   <Option Name = "Mono">...monochrome
<Feature Name = "PageResolution">...resolution setting
   <Option Name = "300dpi">...300 dpi
```

Figure 17:
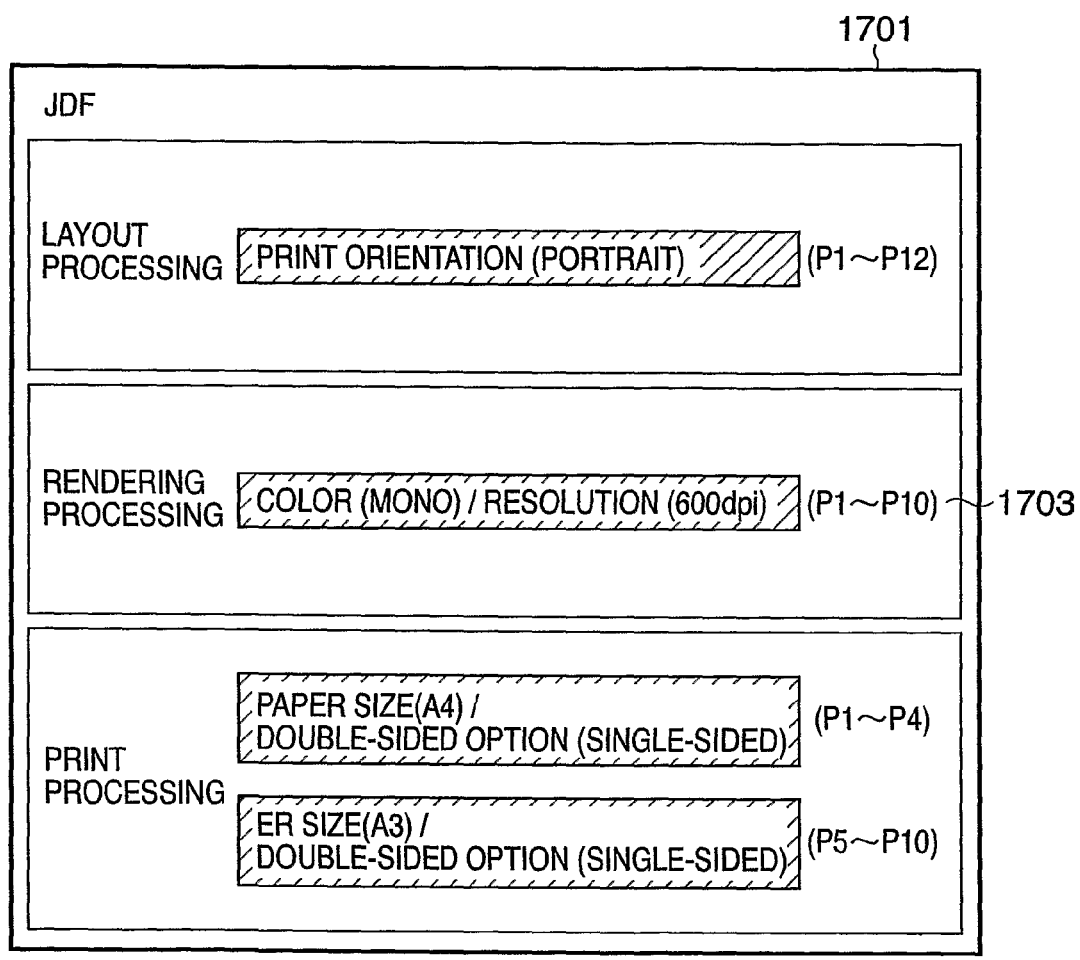
FIG. 17 is a diagram showing an example of the JDF after merging with content of the print ticket.
Figure 28:
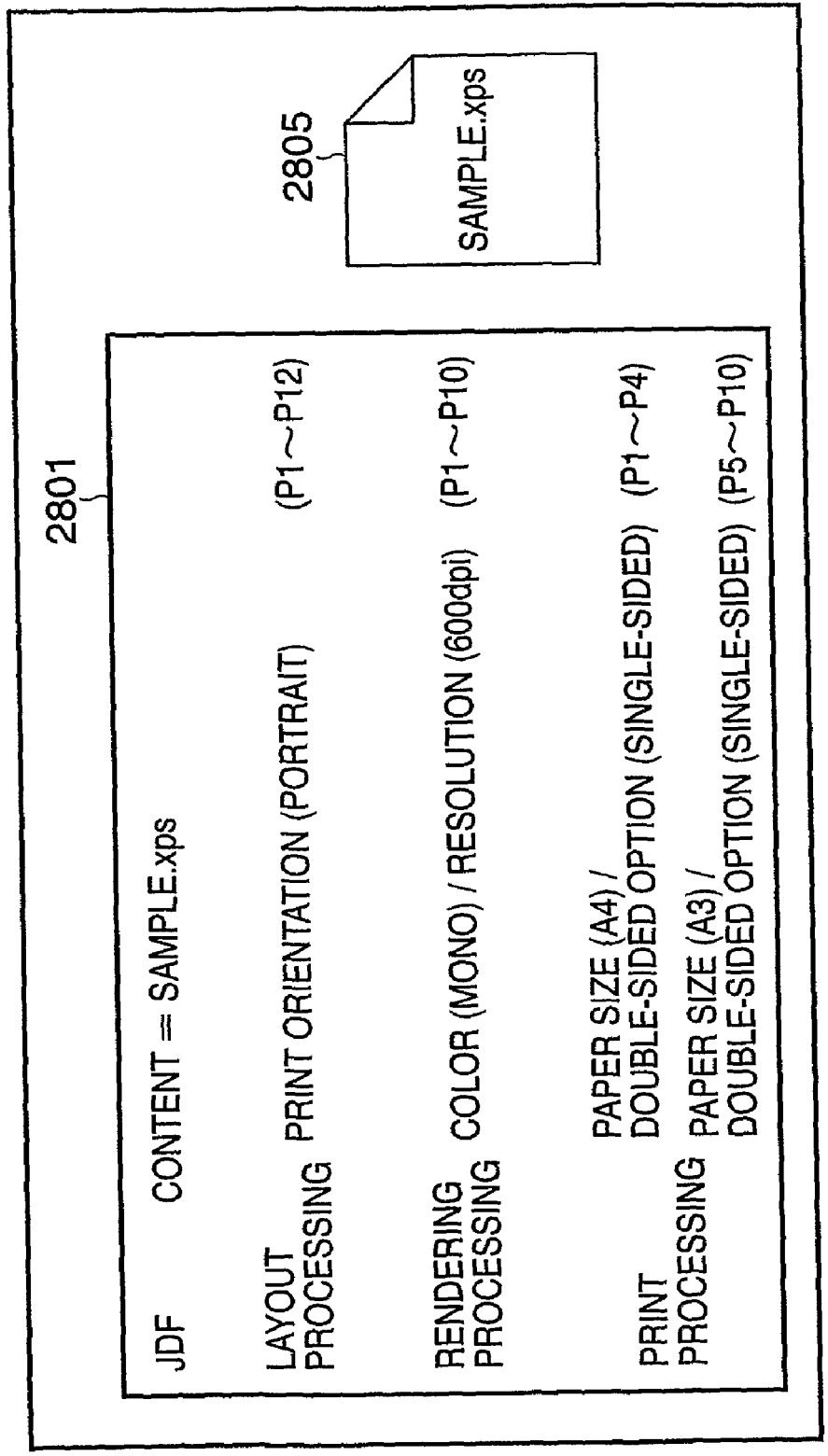
FIG. 28 is a diagram showing an example of a JDF in which XPS has been specified as content data.

Next, in step S1105, the PT merging unit 209 merges the handover items acquired in step S1103 from among the print settings of the input XPS document with the print settings of the JDF data 218. The result of merging the settings of the print ticket of FIG. 14 when the JDF 1601 shown in FIG. 16 has been specified in the hot folder is shown by the JDF data 1701 of FIG. 17. In the example screen of FIG. 6, the color print setting and the output paper size setting are specified as handover items. The "mono" print setting which is the color setting and the "A4" setting which is the output paper size setting from the print ticket 1401 are handed over to the basic settings of the JDF data 218, which are the print settings of the hot folder. Since the basic setting for the color setting of the JDF data 218 is the "color" print setting, the "color" of the rendering processing setting 1603 is converted to the "mono" print setting to give rendering processing setting 1703. For the output paper size 1604, the basic setting of the hot folder is the "A4" size. Consequently, when the output paper size is handed over, there is no change in the setting of the JDF data 218. In the print ticket 1401 the resolution is specified to be 300 dpi, but this resolution setting is not included among the handover items and is not therefore handed over. The processor then proceeds to step S1106 and specifies the XPS document and the content data thereof as the JDF data 1701 to be merged in step S1105. The XPS document file name in the JDF is described as an example. FIG. 28 is an example in which the XPS data 1905 (SAMPLE.xps) is specified as the content in the JDF 1701. SAMPLE.xps is specified using the content specifying unit of JDF 2801. The processor then proceeds to S1108, and transmits package data 1906 resulting from the packaging of the JDF 1901 and the XPS data 1905 to the print device 103.

According to the above procedure, it is possible to realize the hot folder with an XPS document as the input document. In other words, it is possible to perform printing using the print settings specified in the XPS document in an unaltered form. It is also possible to use the print settings specified in the XPS document for only specified items and use the hold folder print settings for other items. It is further possible to completely disregard the print settings of the XPS document and use only the print settings of the hot folder. Further, when the print settings of the XPS document are to be handed over, it is possible to specify whether to hand over the exceptional settings specified for each page unit. This makes it possible to pass only essential items to the print settings included in the XPS document, and to preset the hot folder settings in the clients which are printing so as inherit the XPS settings. By setting the hot folder settings in advance in this way, it is possible to perform printing using settings based on the individual print environment while following the intended print settings of the creator of the XPS document.

Moreover, depending upon which formats the printer supports, it is possible, in the manner described, to switch between alternate printer output formats, including the conventional JDF format, the XPS format, and the XPS-appended JDF format. In the present embodiment, the printer is assumed to be a device which supports both XPS and JDF. However, some printers only support one of these formats, and such printers may also be used.

Note that although in the present embodiment, exceptional print settings are made only at the page level, it is possible to treat exceptional print settings made in the print ticket at the FixedDocument level similarly to exceptional print settings at the page level.

Second Embodiment

Figure 24:
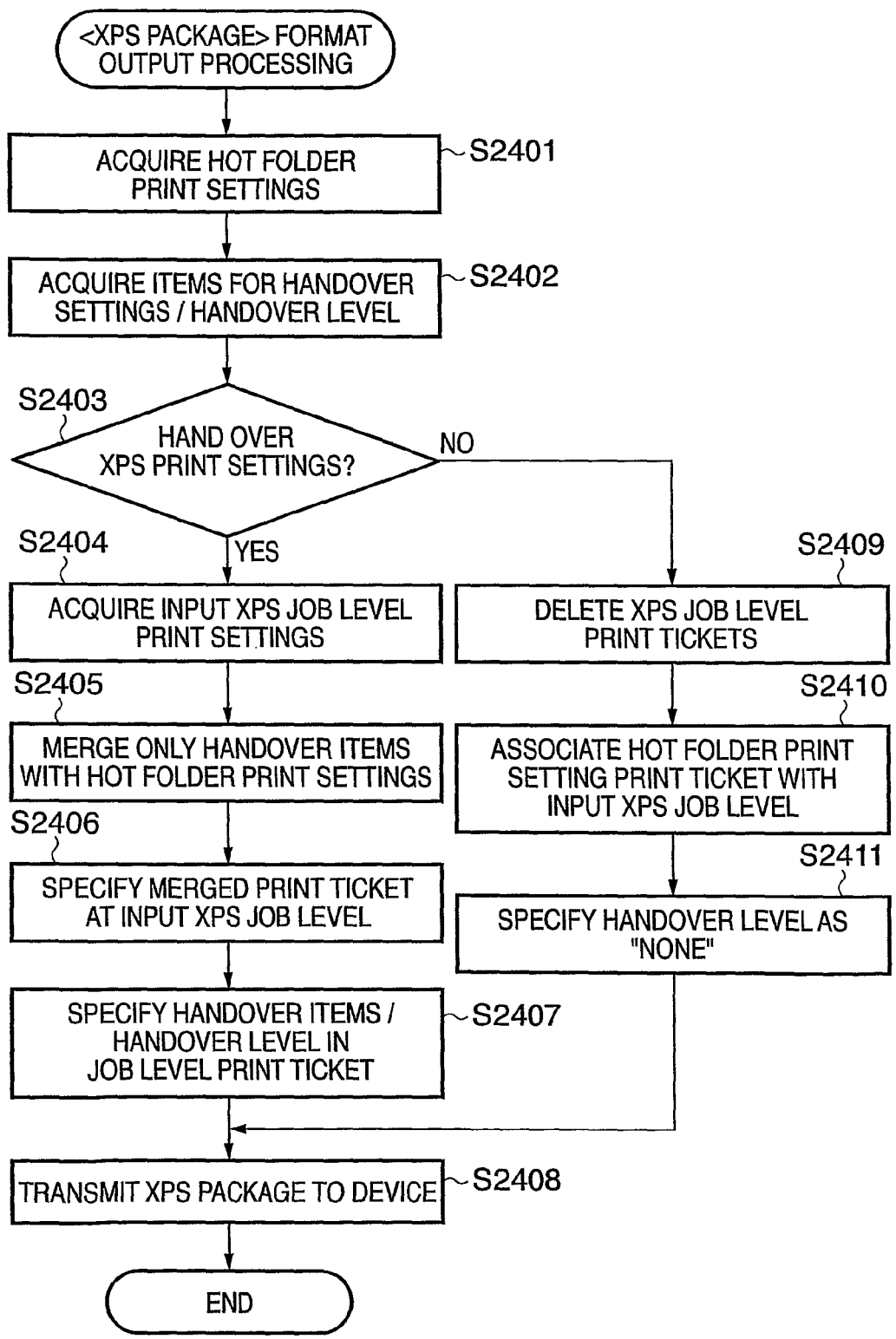
FIG. 24 is an output process flowchart for an XPS package format in a second embodiment.
Figure 25:
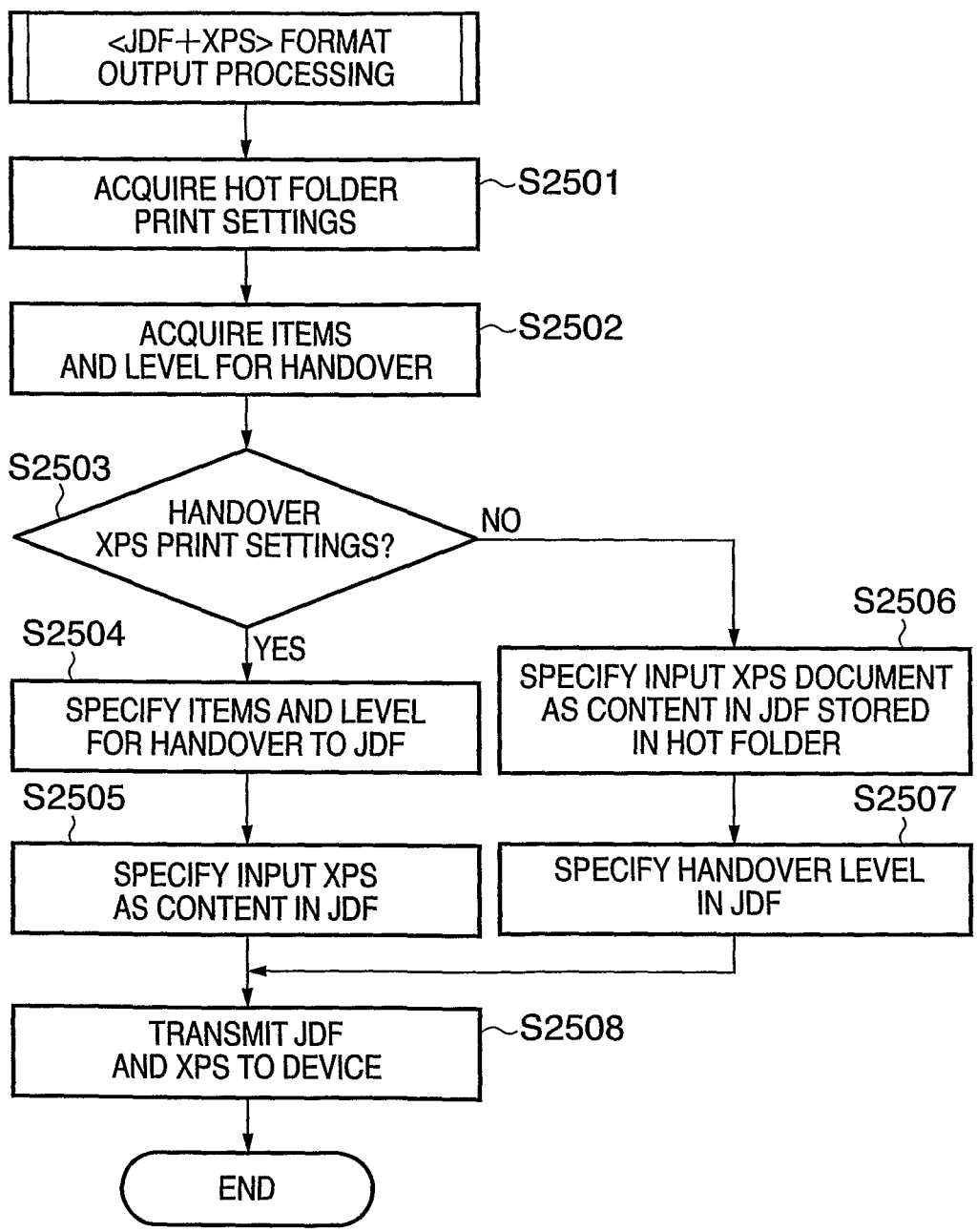
FIG. 25 is an output process flowchart for an XPS format in the second embodiment.

The present embodiment differs from the first embodiment in that the detailed procedures in steps S909 and S910 in FIG. 9 become those shown in FIGS. 24 and 25 respectively.

First, the output processing for the XPS package output format is described with reference to the flowchart of FIG. 24.

In step S2401, the processor acquires the hot folder print setting PT data 217 stored in the print ticket format. Then, in step 2402, the processor acquires the handover items and handover level which are indicated in the XPS performance settings 216 acquired in step S907.

In step S2403, the processor determines whether handover of the print settings of the input XPS document is indicated by the handover items acquired in step S2402. When handover of the XPS print settings is not indicated (i.e., when "prioritize hot folder settings" has been specified using the operating mode 602), the processor proceeds to step S2409.

Figure 30:
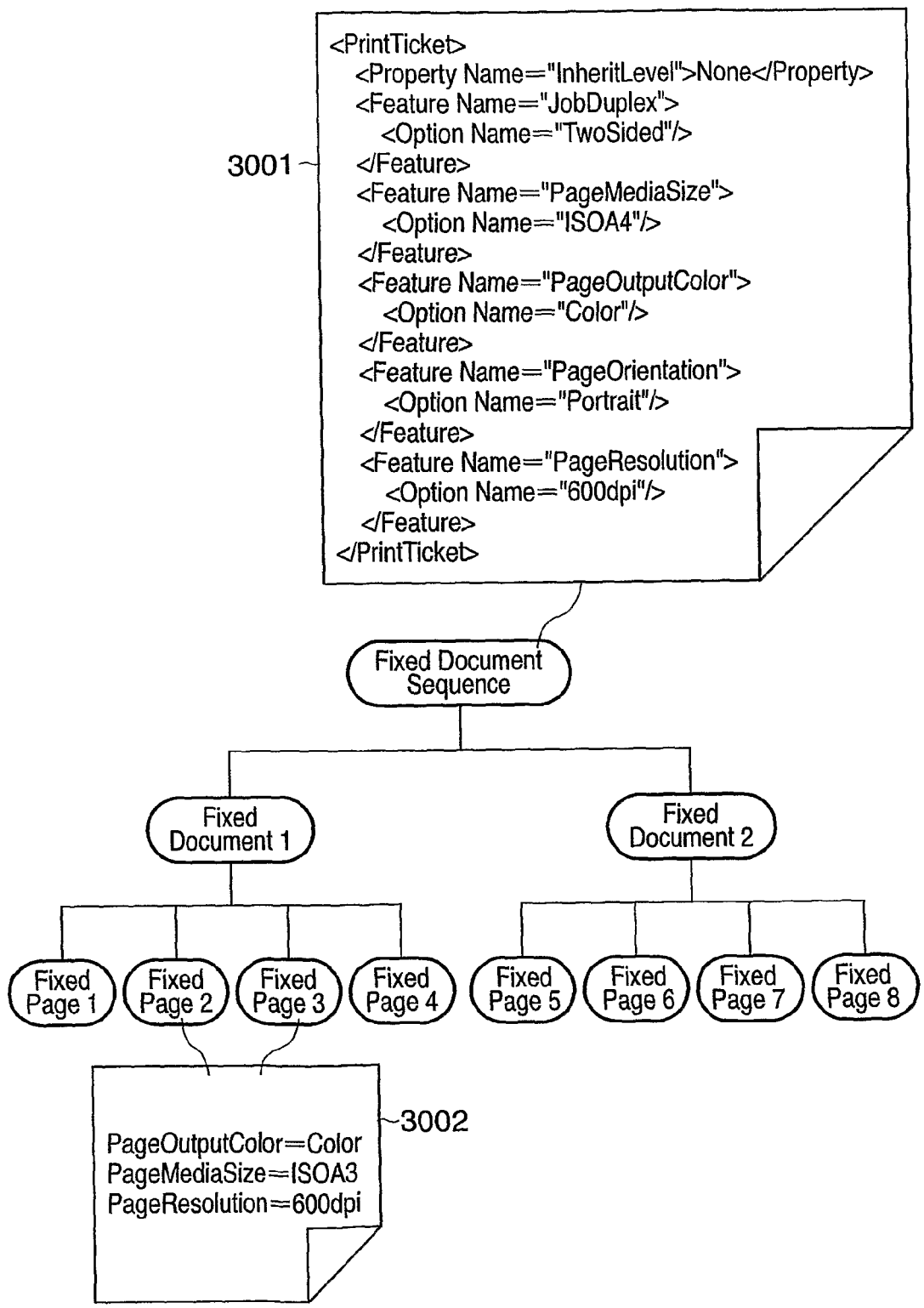
FIG. 30 is a diagram showing an example of an XPS document for which a print ticket including XPS handover settings has been specified.

In step S2409, the processor deletes the job level print ticket 1401 included in the input document of the XPS document format of the type shown in FIG. 14. Here, "job level print settings" is used to mean the print ticket 1401 associated with the FixedDocumentSequence of the XPS document shown in FIG. 14. In step S2410, the processor associates the PT data 217, which includes the print settings input using the hot folder settings, with the FixedDocumentSequence of the input XPS document. In step S2411, the processor specifies "NONE" as the handover level. As a result, a print ticket 2900 of the type shown in FIG. 29 is generated. The handover level "NONE" specified in step S2411 is specified in a handover level specifying unit 2901. In step S2408, the processor transmits the generated XPS document shown in FIG. 30 to the device 103, and terminates processing. When "NONE" has been specified in the handover level specifying unit 2901, upon receipt of the print ticket 2900, the device 103 ignores the content of a print ticket 3002 which is specified at the page level. Consequently, as per the instructions in the hot folder, the print settings of the input XPS document are not handed over.

On the other hand, upon determining in step S2403 that the print settings of the input XPS document are to be handed over, the processor proceeds to step S2404. In step S2404, the processor acquires the job level print settings of the input XPS document. The following print settings are associated with the print ticket 1401.

```
<Feature Name = "PageMediaSize">...paper size setting
    <Option Name = "ISOA4">...A3 size
<Feature Name = "PageOutputColor">...color setting
    <Option Name = "Mono">...monochrome printing
<Feature Name = "PageResolution">...resolution setting
    <Option Name = "300dpi">...300 dpi
```

In step S2405, among the print settings acquired in step S2404, the processor merges only the specified handover items acquired in step S2402 with the hot folder print PT data 217. The print ticket obtained by merging the job level print ticket 1401 included in the input XPS document shown in FIG. 14 and the print ticket 1500 of FIG. 15 is the print ticket 2100 of FIG. 21. It can be seen that in the input document print ticket 1401, only the PageOutputColor and the PageMediaSize, which are the handover items, are handed over to the print ticket 2240.

In step S2406, the processor deletes the job level print ticket 1401 of the input XPS document, and then associates the job level print ticket 2240 at the job level. Next, in steps S2407 and S2406, the processor specifies the handover items and handover level of the XPS document acquired in step S2402 in the print ticket specified at the job level in step S2406. A print ticket 2700 of FIG. 27 is an example of print ticket with specified handover items and handover level. Here, "PAGE" is specified in the handover level specifying unit 2701, and "PageMediaSize" 2703 and "PageOutputColor" 2704 are specified in the handover item specifying unit 2702. An XPS document of the type shown in FIG. 31 with the print ticket 2700 specified at the job level is generated, and transmitted, in step S2408, to the device. On receipt of the print ticket specifying "PAGE" as the handover level, the device applies only the print settings specified in the handover item specifying unit 2702 of the page level print ticket, and executes the print processing. In the example of FIG. 31, the settings values of the PageOutputColor and the PageMediaSize, which are the specified items among the print settings specified in the print ticket 3102 are applied to FixedPage 2 and FixedPage 3.

The following describes output processing for the JDF+ XPS format with reference to the flowchart of FIG. 25. In step S2501, the processor acquires the JDF data 218 which includes the print settings specified in the hot folder. The processor then proceeds to step S2502, and acquires the handover items and handover level of the input XPS document print settings in the XPS performance settings 216 acquired in step S907. In step S2503, the processor determines whether handover of the XPS document print settings has been indicated. When handover of the XPS print settings has not been indicated, the processor proceeds to step S2506. In step S2506, the processor specifies the XPS document input to the JDF data 218 as the content, and, in step S2507, specifies a handover level in the JDF data. In this case, since the XPS document print settings are not to be handed over, the handover level is set to "NONE" as shown in the XPS handover level specifying unit 3202 of the JDF 3201 shown in FIG. 32. Further, in step S2508, the processor transmits the JDF and XPS package data 3206 to the device 103, and terminates processing. When "NONE" is specified in the XPS handover level specifying unit 3202, on receipt of the package data 3206, the device 103 ignores the print settings specified in the XPS document 3207.

Figure 26:
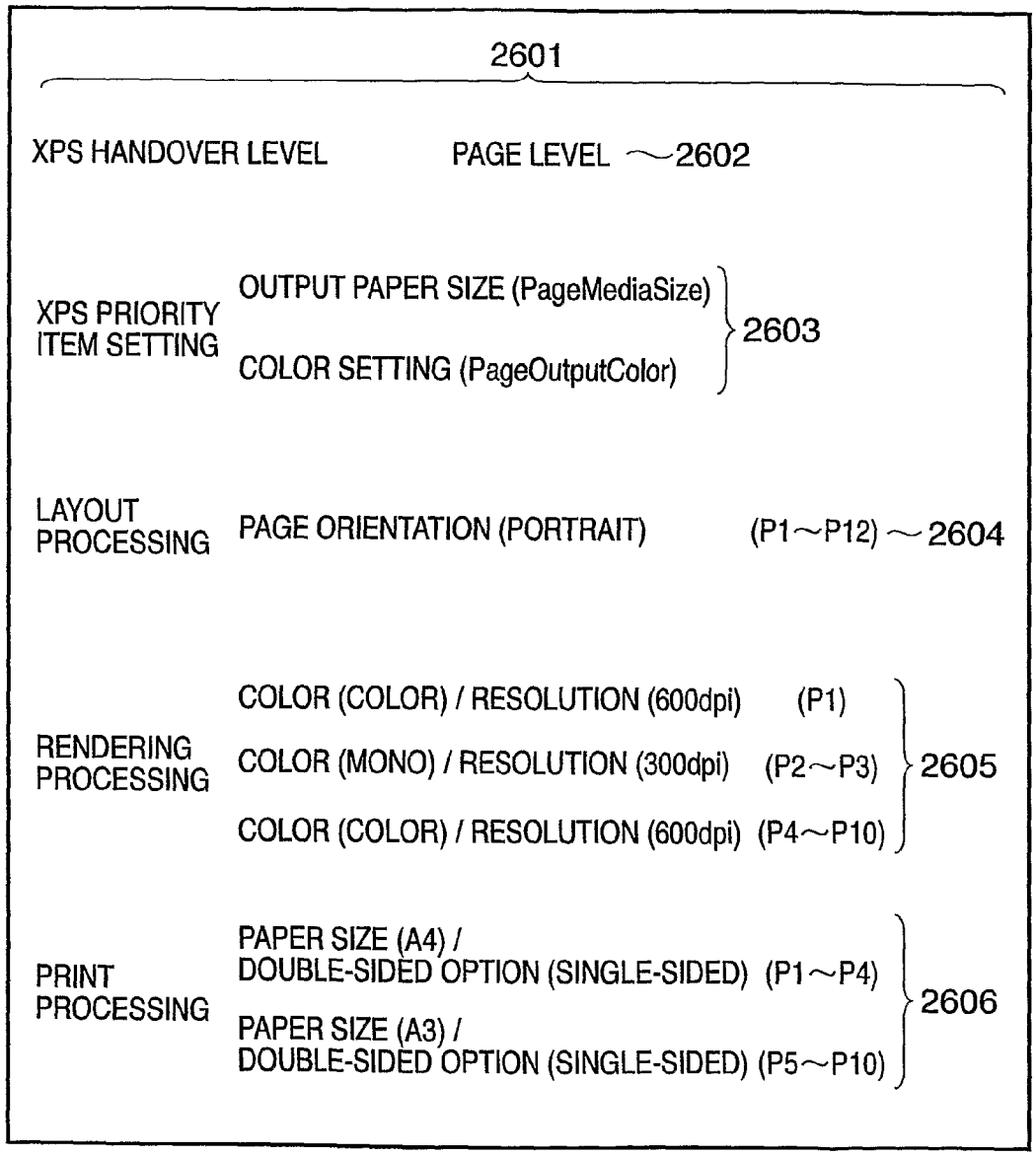
FIG. 26 is a diagram showing an example of a JDF in which XPS handover settings have been specified.
Figure 33:
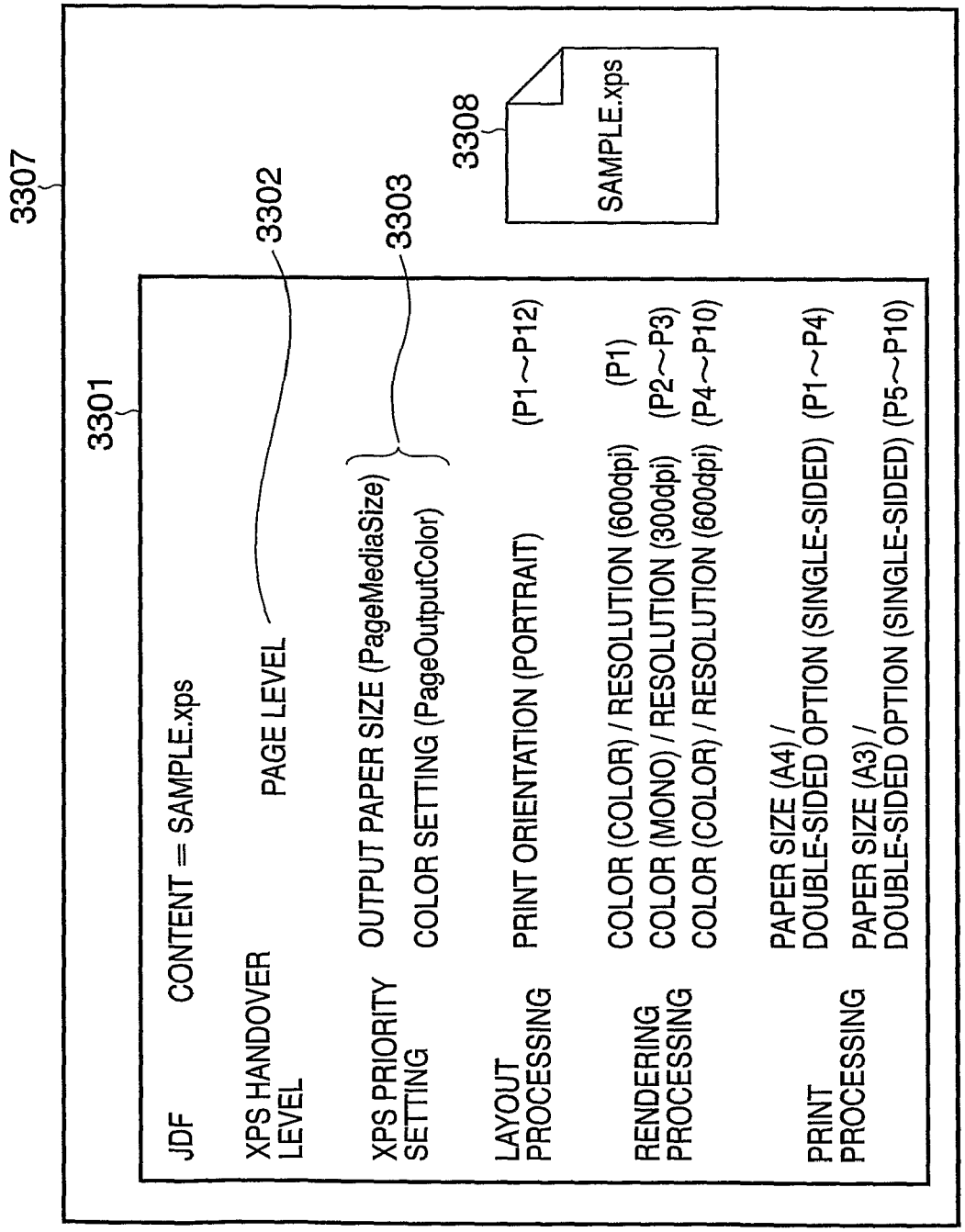
FIG. 33 is a diagram showing an example of a JDF in which an XPS document has been specified as content data.

On the other hand, when determining in step S2503 that there is an instruction to hand over the XPS print settings, the processor proceeds to step S2504. In step S2504, the processor specifies the handover items and handover level of the setting acquired in step S2502 using the handover level specifying unit and XPS priority item specifying unit of the JDF. In the example of the JDF 2601 of FIG. 26, the XPS handover level specifying unit 2602 is set to "PAGE LEVEL". However, the XPS priority item setting specifying unit 2603 is set to "output paper size" and "color setting". Next, in step S2505, the processor specifies the input XPS document 3207 as the content of the JDF 3201 with the specified the handover items and level. As a result, a JDF 3301 of the type shown in FIG. 33 is generated. In step S2508, the processor transmits the XPS package data 3307 to the device 103. In the device 103 which receives the XPS package 3206, the print settings described in the print ticket of the XPS document 3308 are handed over in accordance with the settings of the XPS handover level specifying unit 3302 of JDF and the XPS priority item setting specifying unit 3303.

According to the above-described processing, the present embodiment also allows a hot folder to be realized with an XPS document as the input document.

According to the above-describe procedure, it is possible to realize the hot folder with an XPS document as the input document. In other words, it is possible to perform printing using the print settings specified in the XPS document in an unaltered form. It is also possible to use the print settings specified in the XPS document for only specified items and use the hold folder print settings for other items. It is further possible to completely disregard the print settings of the XPS document and use only the print settings of the hot folder. Further, when the print settings of the XPS document are to be handed over, it is possible to specify in page units whether to hand over the exceptional settings. This makes it possible to pass only essential items to the print settings included in the XPS document, and to preset the hot folder settings in the client which is to perform the printing so that the XPS settings are inherited. By setting the hot folder settings in advance in this way, it is possible to perform printing using settings based on the individual print environment while following the print settings intended by the creator of the XPS document.

Moreover, depending upon which formats the printer supports, it is possible, in the manner described, to switch between alternate printer output formats, including the conventional JDF format, the XPS format, and the XPS-appended JDF format. In the present embodiment, the printer is assumed to be a device which supports both XPS and JDF.

However, some printers only support one of these formats, and such printers may also be used.

Note that the present invention may be applied to a system constructed from a plurality of devices (such as a host computer, an interfacing device, a reader, and a printer) or applied to an apparatus composed of a single device (such as a copier, or a facsimile). Moreover, the object of the present invention can be realized by supplying, to the system or apparatus, a storage medium having a program code for realizing the functions of the above-described embodiments recorded therein, and having a computer in the system or apparatus read and execute the program stored in the storage medium. In such a case, the program code itself read from the storage medium realizes the functions of the above described embodiments, and the program code itself and the storage medium storing the program code constitute the present invention.

The present invention further includes the case in which the functions of the above described embodiments are realized by performing processing based on instructions of the program code, and part or all of the actual processing is performed by an operating system (OS) running on the computer. The present invention is also applicable to cases in which the program code read from the storage medium is written to a memory provided in a function expansion card inserted into the computer or in an expansion unit connected to the computer. In such a case, the functions of the above-described embodiments are realized by performing processing based on the program code written, and a CPU or the like provided in the expansion card or the expansion unit performs all or part of the actual processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-080190, filed Mar. 26, 2007, which is hereby incorporated by reference herein in its entirety.

The invention claimed is:

1. A print control device for adding externally defined external print settings to document data having a layer structure that includes internal print settings corresponding to respective layers of the layer structure, said print control device comprising:
   a storage configured to receive input of the external print settings and input of handover settings relating to a layer to be handed over among the internal print settings and store them;
   a generator configured to generate new print settings of the layer to which a handover is directed, by merging the handover settings relating to the layer to be handed over among the internal print settings with the external print settings when a handover of the print settings has been directed by the handover settings; and
   a data transmitter configured to transmit the print settings generated by said generator together with the document data to a printer device.

2. The print control device of claim 1, wherein
   the handover settings include a priority option for the external print settings, and
   when the priority option for the external print settings is selected, said generator deletes the internal print settings.

3. The print control device of claim 1, wherein
   the storage further stores a setting of an output format for selecting a data format to be transmitted by the data transmitter from among a format of the document data and a format in which the print settings are added to the document data, and
   the generator generates the new print settings in a form of the internal print settings in a case where the format of the document data is selected as the output format, and generates the new print settings in a form of the external print settings in a case where the format in which the print settings are added to the document data is selected as the output format.

4. The print control device of claim 1, wherein,
   the document data has a layer structure comprising a job level layer and a page level layer which is lower than the job level layer, and
   the handover settings include either an instruction to hand over the internal setting of the job level layer rather than the internal print settings of the page level layer, or an instruction to hand over the internal print settings of the page level layer and the job level layer.

5. A print control method for adding externally defined external print settings to document data having a layer structure that includes internal print settings corresponding to respective layers of the layer structure, said print control method comprising:
   a storage step of receiving input of the external print settings and input of handover settings relating to a layer to be handed over among the internal print settings and storing them;
   a generating step of generating new print settings of the layer to which a handover is directed, by merging the handover settings relating to the layer to be handed over among the internal print settings with the external print settings when a handover of the print settings has been directed by the handover settings; and
   a data transmission step of transmitting the print settings generated in said generating step together with the document data to a printer device.

6. The method according to claim 5, wherein,
   the handover settings include a priority option for the external print settings, and
   when the priority option for the external print settings is selected, said generator deletes the internal print settings.

7. The method according to claim 5, wherein
   the storage step further stores a setting of an output format for selecting a data format to be transmitted by the data transmitter from among a format of the document data and a format in which the print settings are added to the document data, and
   the generating step generates the new print settings in a form of the internal print settings in a case where the format of the document data is selected as the output format, and generates the new print settings in a form of the external print settings in a case where the format in which the print settings are added to the document data is selected as the output format.

8. The method according to claim 5, wherein,
   the document data has a layer structure comprising a job level layer and a page level layer which is lower than the job level layer, and
   the handover settings includes either an instruction to hand over the internal setting of the job level layer rather than the internal print settings of the page level layer, or an instruction to hand over the internal print settings of the page level layer and the job level layer.

9. A non-transitory computer-readable medium in which a program is stored for causing a computer to perform a method of controlling print control device for adding externally defined external print settings to document data having a layer structure that includes internal print settings, corresponding to respective layers of the layer structure, said method comprising:

receiving input of the external print settings and input of handover settings relating to a layer to be handed over among the internal print settings and storing them;

generating new print settings of the layer to which a handover is directed by merging the handover settings relating to the layer to be handed over among the internal print settings with the external print settings when a handover of the print settings has been directed by the handover settings; and transmitting the print settings generated in said generating step together with the document data to a printer device.

10. The medium according to claim 9, wherein,
the handover settings include a priority option for the external print settings, and
when the priority option for the external print settings is selected, said generator deletes the internal print settings.

11. The medium according to claim 9, wherein
the storage step further stores a setting of an output format for selecting a data format to be transmitted by the data transmitter from among a format of the document data and a format in which the print settings are added to the document data, and
the generating step generates the new print settings in a form of the internal print settings in a case where the format of the document data is selected as the output format, and generates the new print settings in a form of the external print settings in a case where the format in which the print settings are added to the document data is selected as the output format.

12. The medium according to claim 9, wherein,
the document data has a layer structure comprising a job level layer and a page level layer which is lower than the job level layer, and
the handover settings includes either an instruction to hand over the internal setting of the job level layer rather than the internal print settings of the page level layer, or an instruction to hand over the internal print settings of the page level layer and the job level layer.

* * * * *